(12) United States Patent
Chakraborty et al.

(10) Patent No.: US 11,102,822 B2
(45) Date of Patent: Aug. 24, 2021

(54) CROSS CARRIER RANDOM ACCESS PROCEDURE FOR WIRELESS COMMUNICATION

(71) Applicant: QUALCOMM INCORPORATED, San Diego, CA (US)

(72) Inventors: Kaushik Chakraborty, San Diego, CA (US); Xiaoxia Zhang, San Diego, CA (US); Srinivas Yerramalli, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 102 days.

(21) Appl. No.: 16/684,398

(22) Filed: Nov. 14, 2019

(65) Prior Publication Data

US 2020/0163125 A1 May 21, 2020

Related U.S. Application Data

(60) Provisional application No. 62/769,999, filed on Nov. 20, 2018.

(51) Int. Cl.
*H04W 72/04* (2009.01)
*H04W 74/08* (2009.01)

(52) U.S. Cl.
CPC ..... *H04W 74/0833* (2013.01); *H04W 72/042* (2013.01); *H04W 72/044* (2013.01)

(58) Field of Classification Search
CPC . H04W 74/08; H04W 72/04; H04W 74/0833; H04W 72/044; H04W 72/042
See application file for complete search history.

(56) References Cited

U.S. PATENT DOCUMENTS

2016/0338056 A1* 11/2016 Xue .................. H04L 27/26
2017/0048875 A1* 2/2017 Martin .............. H04W 28/0231
(Continued)

OTHER PUBLICATIONS

Huawei et al., "Four-step RACH procedure for NR-U", 3GPP Draft, 3GPP TSG-RAN WG2 Meeting #103, U-1812657 Four-Step RACH Procedure for NRU, 3RD Generation Partnership Project (3GPP), Mobile Competence centre, 650, Route Des Lucioles, F-06921 Sophia-Antipolis Cedex, France, vol. RAN WG2, No. Gothenburg, Sweden, 20180820 - 20180824 Aug. 10, 2018 (2018-08-10), XP051522251, 3 pp., Retrieved from the Internet: URL:http://www.3gpp.org/ftp/tsg%5Fran/WG2%5FRL2fTSGR2%5F103/Docs/R2%2D1812657%2Ezip [retrieved on Aug. 10, 2018].
(Continued)

*Primary Examiner* — Chi Ho A Lee
*Assistant Examiner* — Andrew Lee
(74) *Attorney, Agent, or Firm* — Liem T. Do

(57) ABSTRACT

Wireless communications systems and methods related to communications in a network that supports data transmitted in an unlicensed frequency band and a licensed frequency band are provided. A first wireless communication device transmits in a first frequency band, a first system information signal indicating a first random access configuration for a second frequency band. The first wireless communication device transmits in a third frequency band, a second system information signal indicating a second random access configuration for the second frequency band. The first and third frequency bands are different frequency bands. Additionally, the first wireless communication device performs with a second wireless communication device, a random access procedure based on at least one of the first random access configuration or the second random access configuration.

30 Claims, 12 Drawing Sheets

(56) References Cited

U.S. PATENT DOCUMENTS

| | | | |
|---|---|---|---|
| 2017/0118776 A1* | 4/2017 | Yasukawa | H04W 28/08 |
| 2017/0251373 A1 | 8/2017 | Ding et al. | |
| 2017/0280330 A1* | 9/2017 | Martin | H04W 16/14 |
| 2017/0346685 A1* | 11/2017 | Wang | H04L 5/0091 |
| 2018/0368157 A1* | 12/2018 | Jeon | H04L 5/0044 |
| 2019/0281592 A1* | 9/2019 | Liu | H04L 27/0006 |
| 2020/0029318 A1* | 1/2020 | Guo | H04L 1/1819 |
| 2020/0107369 A1* | 4/2020 | Jeon | H04W 74/0833 |
| 2020/0109322 A1* | 4/2020 | Liang | H01L 33/56 |
| 2020/0245364 A1* | 7/2020 | Kim | H04W 74/004 |
| 2020/0359426 A1* | 11/2020 | Pan | H04W 16/14 |

OTHER PUBLICATIONS

International Search Report and Written Opinion—PCT/US2019/061794—ISA/EPO —Feb. 26, 2020.

Vivo: "Design considerations for standalone operation in NR unlicensed spectrum", 3GPP Draft, 3GPP TSG RAN WG1 Meeting #92, R1-1801558, 3RD Generation Partnership Project (3GPP), Mobile Competence Centre, 650, Route Des Lucioles, F-06921 Sophia-Antipolis Cedex,; France , vol. RAN WG1, No. Athens, Greece, 20180226-20180302 Feb. 15, 2018 (Feb. 15, 2018), XP051396810, 4 Pages, Retrieved from the Internet: URL:http://www.3gpp.org/ftp/tsg%5Fran/WG1%5FRL1fTSGR1%5F92/Docs/ letrieved on Feb. 15, 2018.

Vivo: "Enhancement of 4-step RACH for NR-U", 3GPP Draft, 3GPP TSG-RAN WG2 Meeting #103, U-1811780_Enhancement of 4-Step RACH for NR-U, 3RD Generation Partnership Project (3GPP), Mobile competence Centre, 650, Route Des Lucioles, F-06921 Sophia-Antipolis Cedex, France, vol. Ran WG2, No. 3othenburg, Sweden, 20180820-20180824 Aug. 10, 2018 (Aug. 10, 2018), XP051521419, 3 pages, Retrieved from he Internet: URL:http://www.3gpp.org/ftp/tsg%5Fran/WG2%5FRL21TSGR2%5F103/Docs/R2%2D1811780%2Ezip.

* cited by examiner

CROSS CARRIER RANDOM ACCESS PROCEDURE FOR WIRELESS COMMUNICATION

CROSS REFERENCE TO RELATED APPLICATIONS & PRIORITY CLAIM

The present application claims priority to and the benefit of U.S. Provisional Patent Application No. 62/769,999 filed Nov. 20, 2018, which is hereby incorporated by reference in its entirety.

TECHNICAL FIELD

This application relates to wireless communication systems, and more particularly to communications in a network deployed over a licensed supplemental downlink (SDL) paired with an unlicensed carrier.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of a NR cell in an unlicensed spectrum. For example, a NR cell may be deployed in a standalone NR-U mode over one or more unlicensed frequency bands. NR-U may also support cell deployments using various combinations of unlicensed bands and licensed bands. For example, a NR cell may be deployed using carrier aggregation to combine a NR licensed band with a NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, a NR cell may be deployed using dual connectivity between an LTE licensed band and a NR unlicensed band, where the LTE licensed band may function as a PCell and the NR unlicensed band may function as a SCell. In yet another example, a NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device in a first frequency band, a first system information signal indicating a first random access configuration for a second frequency band; transmitting, by the first wireless communication device in a third frequency band, a second system information signal indicating a second random access configuration for the second frequency band, wherein the first and third frequency bands are different frequency bands; and performing, by the first wireless communication device with a second wireless communication device, a random access procedure based on at least one of the first random access configuration or the second random access configuration.

In an additional aspect of the disclosure, an apparatus includes a transceiver configured to transmit in a first frequency band, a first system information signal indicating a first random access configuration for a second frequency band; transmit in a third frequency band, a second system information signal indicating a second random access configuration for the second frequency band, wherein the first and third frequency bands are different frequency bands; and further configured to perform, with a second wireless communication device, a random access procedure based on at least one of the first random access configuration or the second random access configuration.

In an additional aspect of the disclosure, a computer-readable medium includes program code recorded thereon, the program code including code for causing a first wireless communication device to transmit in a first frequency band, a first system information signal indicating a first random access configuration for a second frequency band; code for causing the first wireless communication device to transmit in a third frequency band, a second system information signal indicating a second random access configuration for the second frequency band, wherein the first and third frequency bands are different frequency bands; and code for causing the first wireless communication device to perform with a second wireless communication device, a random access procedure based on at least one of the first random access configuration or the second random access configuration.

In an additional aspect of the disclosure, an apparatus includes means for transmitting in a first frequency band, a first system information signal indicating a first random access configuration for a second frequency band; means for transmitting in a third frequency band, a second system information signal indicating a second random access configuration for the second frequency band, wherein the first and third frequency bands are different frequency bands; and means for performing with a second wireless communication device, a random access procedure based on at least one of the first random access configuration or the second random access configuration.

For example, in an aspect of the disclosure, a method of wireless communication includes receiving, by a first wireless communication device from a second wireless communication device in a first frequency band, a first system information signal indicating a first random access configuration for a second frequency band; transmitting, by the first wireless communication device in the second frequency band, a first communication signal including a random access request or a connection request based on the first random access configuration; and receiving, by the first wireless communication device from second wireless communication device in a third frequency band, a second communication signal in response to the first communication signal.

In an additional aspect of the disclosure, an apparatus includes a transceiver configured to receive from a second wireless communication device in a first frequency band, a first system information signal indicating a first random access configuration for a second frequency band; transmit in the second frequency band, a first communication signal including a random access request or a connection request based on the first random access configuration; and further configured to receive from second wireless communication device in a third frequency band, a second communication signal in response to the first communication signal.

In an additional aspect of the disclosure, a computer-readable medium includes program code recorded thereon, the program code including code for causing a first wireless communication device to receive in a first frequency band, a first system information signal indicating a first random access configuration for a second frequency band; code for causing the first wireless communication device to transmit in the second frequency band, a first communication signal including a random access request or a connection request based on the first random access configuration; and code for causing the first wireless communication device to receive in a third frequency band, a second communication signal in response to the first communication signal.

In an additional aspect of the disclosure, an apparatus includes means for receiving in a first frequency band, a first system information signal indicating a first random access configuration for a second frequency band; means for transmitting in the second frequency band, a first communication signal including a random access request or a connection request based on the first random access configuration; and means for receiving in a third frequency band, a second communication signal in response to the first communication signal.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
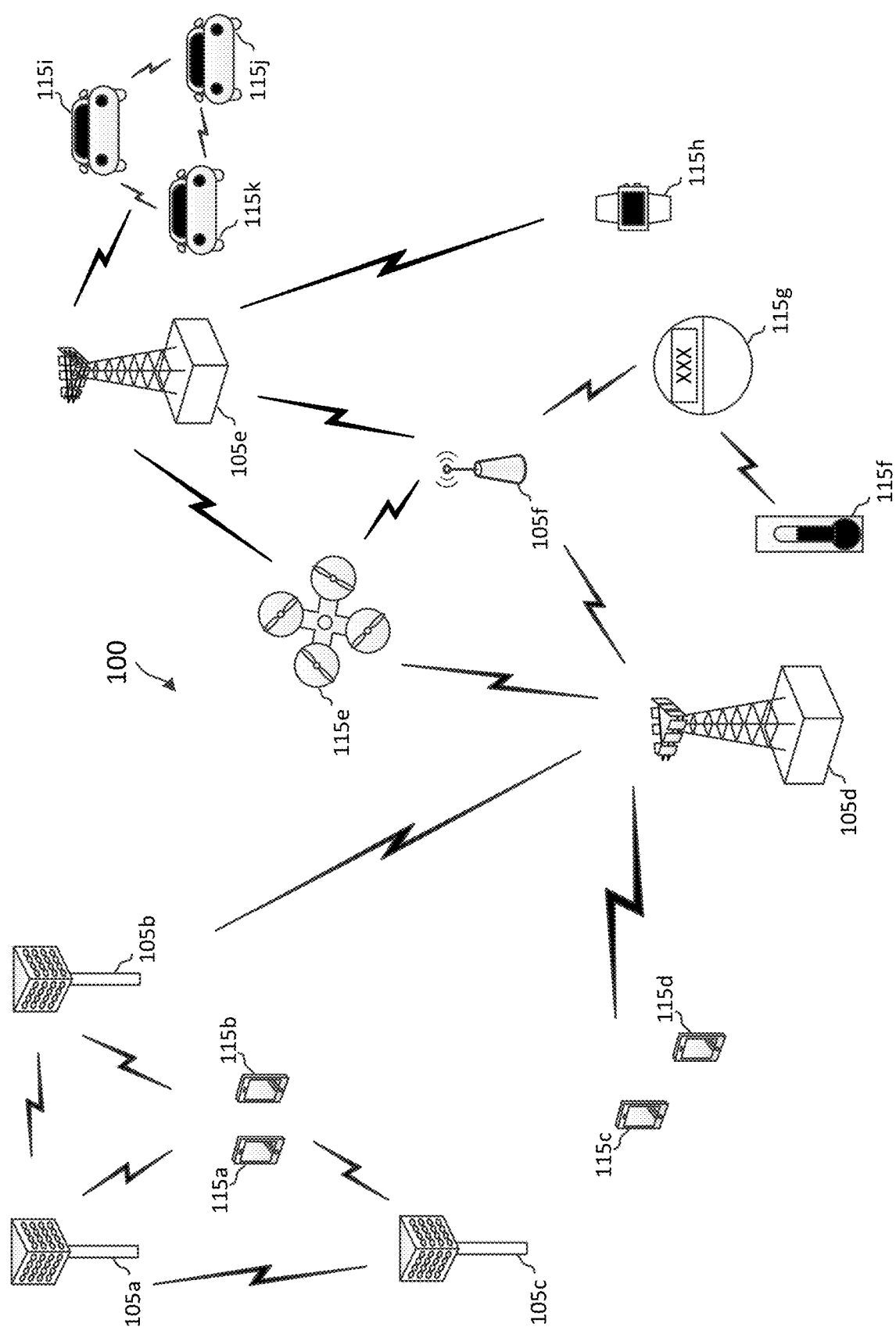
FIG. 1 illustrates a wireless communication network according to one or more embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for improving communications between wireless devices by utilizing a supplemental DL (SDL) licensed band paired with an unlicensed band. A wireless communications system may support DL transmissions by a BS when operating in unlicensed spectrum and/or licensed spectrum. In some examples, carrier aggregation may involve aggregation of a first component carrier with a second component carrier for facilitation of communications between the BS and a UE. In an example, the first component carrier is a sub-6 GHz band, and the second component carrier is in the mmWave frequency band. In an example, the BS transmits anchor signals in both a normal DL (NDL) unlicensed band and a SDL licensed band, and random access channel (RACH) resources for both frequency bands are assigned on a common normal UL (NUL) unlicensed band. RACH resources may be partitioned to distinguish between UEs that use anchor signals from the NDL unlicensed band or the SDL licensed band. The UE may select RACH resources corresponding to the NDL unlicensed band or the SDL licensed band in the NUL unlicensed band for a random access message transmission for performing a random access procedure. As discussed in more detail below, the BS may leverage a NDL unlicensed band and/or a SDL licensed band as a cross-carrier RACH resource indication channel for providing information to the UE for selection of an anchor DL carrier. After selection of the anchor DL carrier, the UE can perform a random access procedure to establish a connection with the BS.

The present disclosure provides techniques for using two different DL channels and a common UL channel for performing a random access procedure. In the present disclosure, the terms "non-SDL carrier," "primary DL carrier," "NDL carrier," "DL unlicensed band," and "unlicensed frequency band" may be used interchangeably. Additionally, the terms "SDL carrier," "SDL licensed band" and "licensed frequency band" may be used interchangeably.

FIG. 1 illustrates a wireless communications network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of 3 dimension (3D), full dimension (FD), or massive Multiple Input-Multiple Output (MIMO). The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may operate over shared frequency bands or unlicensed frequency bands, for example, at about 3.5 gigahertz (GHz), sub-6 GHz or higher frequencies in the mmWave band. Operations in unlicensed spectrum may include DL transmissions and/or UL transmissions. The network 100 may partition a frequency band into multiple channels or subbands, for example, each occupying about 20 megahertz (MHz). The BSs 105 and the UEs 115 may be operated by multiple network operating entities sharing resources in the shared or unlicensed frequency spectrum and may perform a LBT procedure (e.g., clear channel assessment (CCA)) prior to communicating to determine whether the channel is available. Listen-before-talk (LBT) is a channel access scheme that may be used in the unlicensed spectrum. In an example, a wireless communication device (e.g., the BS 105 or the UE 115) may employ a LBT procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. In an example, the BS 105 may perform a LBT in the frequency band prior to transmitting in the frequency band and may transmit in one or more channels based on the LBT result. If the channel is available (performance of the LBT results in a LBT pass), the BS 105 may perform a DL transmission, receive a UL transmission from the UE 115, and/or schedule the UE 115 for data transmission and/or reception within a TXOP. If the channel is not available (performance of the LBT results in a LBT fail), the BS 105 may back off and perform the LBT procedure again at a later point in time.

The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The UE 115 and the BS 105 may perform a four-step random access procedure or a two-step random procedure.

Figure 2:
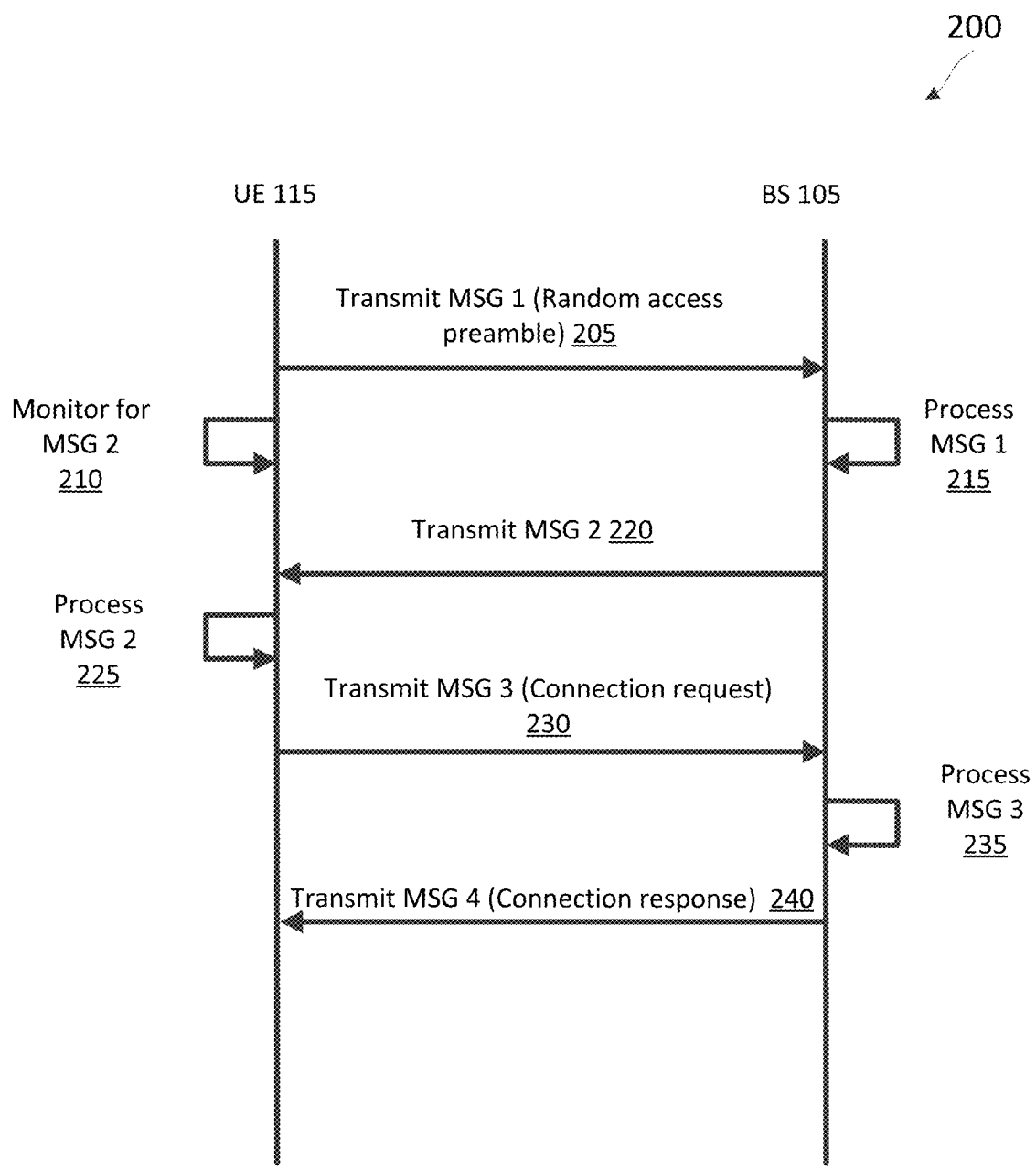
FIG. 2 is a protocol diagram of a method of performing a four-step random access procedure according to embodiments of the present disclosure.

FIG. 2 is a protocol diagram of a method 200 of performing a four-step random access procedure according to embodiments of the present disclosure. Steps of the method 200 can be executed by computing devices (e.g., a processor, processing circuit, and/or other suitable component) of wireless communication devices, such as the BS 105 and the UE 115. As illustrated, the method 200 includes a number of enumerated steps, but embodiments of the method 200 may include additional steps before, after, and in between the enumerated steps. In some embodiments, one or more of the enumerated steps may be omitted or performed in a different order. The method 200 illustrates one BS 105 and one UE 115 for purposes of simplicity of discussion, though it will be recognized that embodiments of the present disclosure may scale to many more UEs 115 and/or BSs 105.

At step 205, the UE 115 transmits a first random access message (MSG 1) carrying a random access preamble according to the PRACH configuration. In some examples, the MSG 1 also includes a payload and a random access identifier (ID). The random access ID for a particular sent random access preamble can be derived based on the frequency-time resource used by the UE 115 to send the particular random access preamble. The random access IDs of the random access preambles are independent of each other. In the context of LTE, the random access IDs are referred to as random access-radio network temporary identifiers (RA-RNTIs). RACH resources may be assigned on the NUL unlicensed band. A set of RACH resources on the NUL unlicensed band corresponds to a NDL unlicensed band, and a set of RACH resources on the NUL unlicensed band corresponds to a SDL licensed band. In an example, the UE transmits MSG 1 on a RACH resource corresponding to the NDL unlicensed band. In another example, the UE transmits MSG 1 on a RACH resource corresponding to the SDL licensed band.

At step 210, after sending the MSG 1, the UE 115 monitors for a second random access message (MSG 2) from the BS 105 within a random access response (RAR) window. In an example, the UE 115 sends a random access preamble in mini-slot I of Kth subframe, a corresponding RAR window begins at mini-slot starting J of (N+K)th subframe and spans a duration of L, where N may be greater than or equal to 0, and J and L may be defined in one of the SIBs broadcasted by the BS 105. The UE 115 monitors for a RAR based on the random access ID to identify whether a received RAR is a response to the random access preamble transmitted by the UE 115.

At step 215, upon detecting the MSG 1, the BS 105 processes the MSG 1. For each detected random access preamble, the BS 105 may determine UL transmission timing of the UE 115 and assign a UL resource and a temporary ID to the UE 115 for sending a subsequent message. The BS 105 may assign the UL resources based on the random access message transmission configuration, for example, the tone spacing, the symbol timing, the starting time, and/or the ending time of the UL control and data channels. The BS 105 may identify a subsequent (or next) random access message (e.g., MSG 3) from the UE 115 by the temporary ID. In the context of LTE, the temporary IDs are referred to as temporary cell-radio network temporary identifiers (C-RNTIs).

At step 220, for each detected random access preamble, the BS 105 transmits a MSG 2 according to the random access message transmission configuration. The MSG 2, which is the RAR, is a response to the random access preamble received from the UE 115. A RAR may be carried in one or more mini-slots or one or more slots. Each RAR may include a control portion and a data portion. The MSG 2 carries an UL grant that may be used by the UE 115 to transmit content to the BS 105. The control portion is generated based on the random access ID of a corresponding random access preamble. The data portion carries a corresponding assigned resource, a corresponding assigned temporary ID, and corresponding timing advance information determined based on corresponding uplink transmission timing. In an example, the MSG 2 includes the assigned resources, the temporary ID, and the timing advance information. The BS may transmit the MSG 2 in the NDL unlicensed band and/or the SDL licensed band. In some examples, the BS transmits portions of MSG 2 in different DL frequency bands. The BS may determine in which frequency band to transmit portions of the MSG 2 based on, for example, a timing of a TXOP (e.g., whether transmission may be completed within the current TXOP) or the UE's indication that it is experiencing good signal quality on a particular frequency band.

At step 225, upon detecting the MSG 2, the UE 115 processes the MSG 2. In an example, the UE 115 retrieves the assigned resources, the temporary ID, and the timing advance information from the MSG 2. The UE may receive the MSG 2 in the NDL unlicensed band and/or SDL licensed band from the BS.

At step 230, the UE 115 transmits a third random access message (MSG 3), which carries a connection request to the BS 105. In an example, the UE 115 responds to the RAR received from the BS 105 by transmitting the MSG 3. The MSG 3 may be sent according to the assigned resource, the temporary ID, the timing advance information, and the random access message transmission configuration. The MSG 3 may be carried in one or more mini-slots or one or more slots. RACH resources corresponding to the NDL unlicensed band and the SDL licensed band are assigned on the NUL licensed band. In an example, the UE transmits MSG 3 on a RACH resource corresponding to the NDL unlicensed band. In another example, the UE transmits MSG 3 on a RACH resource corresponding to the SDL licensed band.

At step 235, upon receiving the MSG 3, the BS 105 processes the MSG 3 and determines that the MSG 3 is sent in response to a RAR by the temporary ID. Accordingly, the BS 105 determines that the UE assigned to the temporary ID desires to connect to the network. At step 240, the BS 105 acknowledges receiving the MSG 3 by sending a MSG 4, which carries a connection response to the UE 115. The MSG 4 may be carried in one or more mini-slots or one or more slots.

Figure 3:
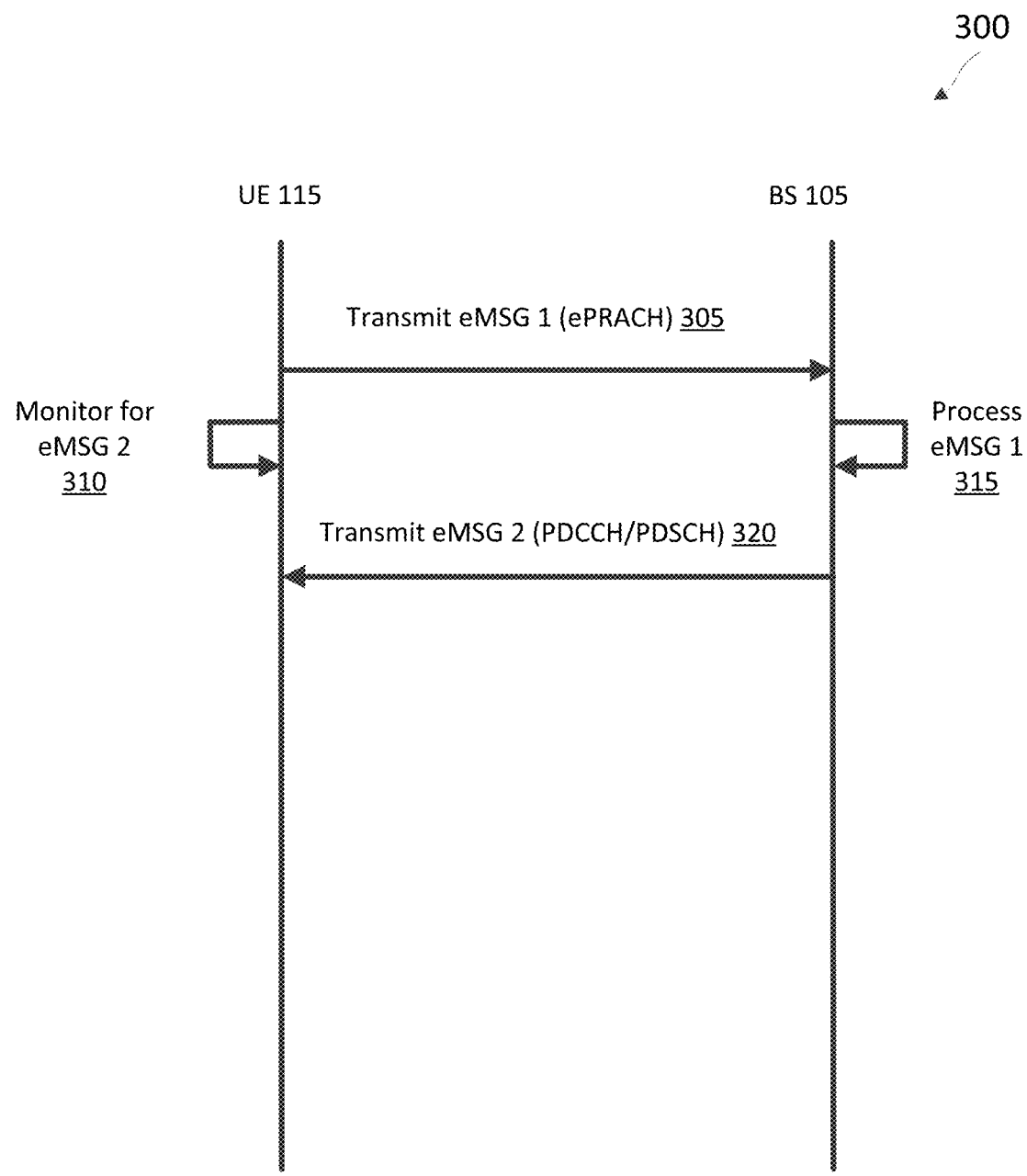
FIG. 3 is a protocol diagram of a method of performing a two-step random access procedure according to embodiments of the present disclosure.

Subsequently, the UE 115 may continue to initiate a registration process with the BS 105. The UE 115 may transmit an ACK for MSG 4 to the BS 105. In this example, the ACK corresponds to MSG 4 and indicates that the UE received the MSG 4. The BS may transmit the MSG 4 in the NDL unlicensed band and/or the SDL licensed band. In some examples, the BS transmits portions of MSG 4 in different DL frequency bands. The BS may determine in which frequency band to transmit portions of the MSG 4 based on, for example, a timing of a TXOP (e.g., whether transmission may be completed within the current TXOP) or the UE's indication that it is experiencing good signal quality on a particular frequency band FIG. 3 is a protocol diagram of a method 300 of performing a two-step random access procedure according to embodiments of the present disclosure. Steps of the method 300 can be executed by computing devices (e.g., a processor, processing circuit, and/or other suitable component) of wireless communication devices, such as the BS 105 and the UE 115. As illustrated, the method 300 includes a number of enumerated steps, but embodiments of the method 300 may include additional steps before, after, and in between the enumerated steps. In some embodiments, one or more of the enumerated steps may be omitted or performed in a different order. The method 300 illustrates one BS 105 and one UE 115 for purposes of simplicity of discussion, though it will be recognized that embodiments of the present disclosure may scale to many more UEs 115 and/or BSs 105.

At step 305, the UE 115 transmits a first enhanced message 1 (eMSG 1), which includes the MSG1 and the MSG3 of the method 200. The UE 115 may transmit the eMSG 1 in an enhanced physical random access channel (ePRACH). The ePRACH may include PUSCHs and a PRACH, as described in greater detail herein. The eMSG 1 may include a random access preamble, an RRC connection request, a tracking area update, a scheduling request, and a UE identifier (UE-ID). For example, the PRACH can be transmitted in the PRACH of the ePRACH and the remaining eMSG1 can be transmitted in the PUSCHs of the ePRACH. In an example, the UE transmits eMSG 1 on a RACH resource that corresponds to the NDL unlicensed band and is in the NUL licensed band. In another example, the UE transmits eMSG 1 on a RACH resource that corresponds to the SDL licensed band and is in the NUL licensed band. At step 310, after sending the eMSG 1, the UE 115 monitors for a second enhanced message (eMSG 2) within a RAR window from the BS 105.

At step 315, upon detecting the eMSG 1, the BS 105 processes the eMSG 1. At step 320, the BS 105 transmits the eMSG 2, which can include the information of MSG 2 and MSG 4 of the method 200. The BS 105 may transmit allocation information for the eMSG 2 in a PDCCH and the eMSG2 in a PDSCH. The eMSG2 may include a detected random access preamble ID, timing advance information, a C-RNTI, a backoff indicator, and a contention resolution. The BS may transmit the eMSG 2 in the NDL unlicensed band and/or the SDL licensed band. In some examples, the BS transmits portions of eMSG 2 in different DL frequency bands. The BS may determine in which frequency band to transmit portions of the eMSG 2 based on, for example, a timing of a TXOP (e.g., whether transmission may be completed within the current TXOP or the UE's indication that it is experiencing good signal quality on a particular frequency band. Subsequently, the UE 115 may continue to initiate a registration process with the BS 105. The UE 115 may transmit an ACK for the eMSG 2 to the BS 105.

It should be understood that reference to the reception/transmission of MSG 1 and MSG 3 (see FIG. 2) may refer to the reception/transmission of eMSG 1 (see FIG. 3), respectively, and reference to the reception/transmission of MSG 2 and MSG 4 (see FIG. 2) may refer to the reception/transmission of eMSG 2 (see FIG. 3), respectively. It should also be understood that reference to the reception/transmission of the ACK for MSG 4 (see FIG. 2) may refer to the reception/transmission of the ACK for eMSG 2 (see FIG. 3), respectively.

Network operating entities may perform a random access procedure using the two-step random access procedure in the method 300 or the four-step random access procedure in the method 200. When a UE 115 and a BS 105 perform the method 200 or 300 over a shared channel, each of the UE 115 and the BS 105 ensures that the channel is clear before transmitting a random access message (e.g., MSG1, MSG2, MSG3, MSG4, eMSG1, and eMSG2) in the shared channel.

A wireless communications system provides for a non-standalone mode in NR by supporting both a NUL unlicensed band and a NDL unlicensed band, which utilize unlicensed spectrum, and a SDL licensed band, which utilizes the licensed spectrum. An operator may have the SDL licensed band but not a corresponding UL licensed band. In some examples, DL and UL communications may both be on the same unlicensed band (TDD). For FDD systems, DL and UL may be on separate bands. In the present disclosure, the terms "NDL," "DL unlicensed carrier," "NDL carrier," "DL unlicensed band," and "unlicensed DL frequency band" may be used interchangeably. Additionally, the terms "SDL," "DL licensed carrier," "SDL carrier," "DL licensed band" and "licensed DL frequency band" may be used interchangeably.

The present application provides techniques for performing a random access procedure using a cross-carrier RACH resource indication. A BS may transmit anchor signals (e.g., SSBs) on either of the NDL unlicensed band or the SDL licensed band. Different random access configurations corresponding to the NDL unlicensed band or the SDL licensed band may be used for different UEs for various reasons. For example, rather than all UEs communicating in the NDL unlicensed band or in the SDL licensed band, the network load may be distributed across the two DL channels. An advantage of using the NDL licensed band for the random access procedures is that it can provide for larger coverage overall. In an example, the SDL licensed band is located at frequencies above 6 GHz (e.g., mmWave frequency band), and the NDL unlicensed band is located at frequencies of about sub-6 GHz. Communications in the mmWave frequency band may have a high path-loss, and thus may have a smaller coverage than the NDL unlicensed band. Further, if a large number of UEs are communicating signals in the SDL licensed band, there would be smaller coverage overall. Additionally, performance in the SDL licensed band may be sensitive to beam management.

An advantage of using the SDL licensed band for the random access procedures is that it can mitigate the randomness caused by performing LBT for channel access. For example, when operating in the SDL licensed band, the BS may schedule data transmissions on a more consistent basis utilizing the licensed frequency band because it is unnecessary for the BS to contend for the licensed medium. In contrast, access to the NDL unlicensed band may be gated by LBT. For example, if a large number of UEs are communicating signals in the NDL unlicensed band, the initial access procedure may be more complex because the UE may monitor for a longer period of time due to the unlicensed nature of the unlicensed band.

Figure 4:
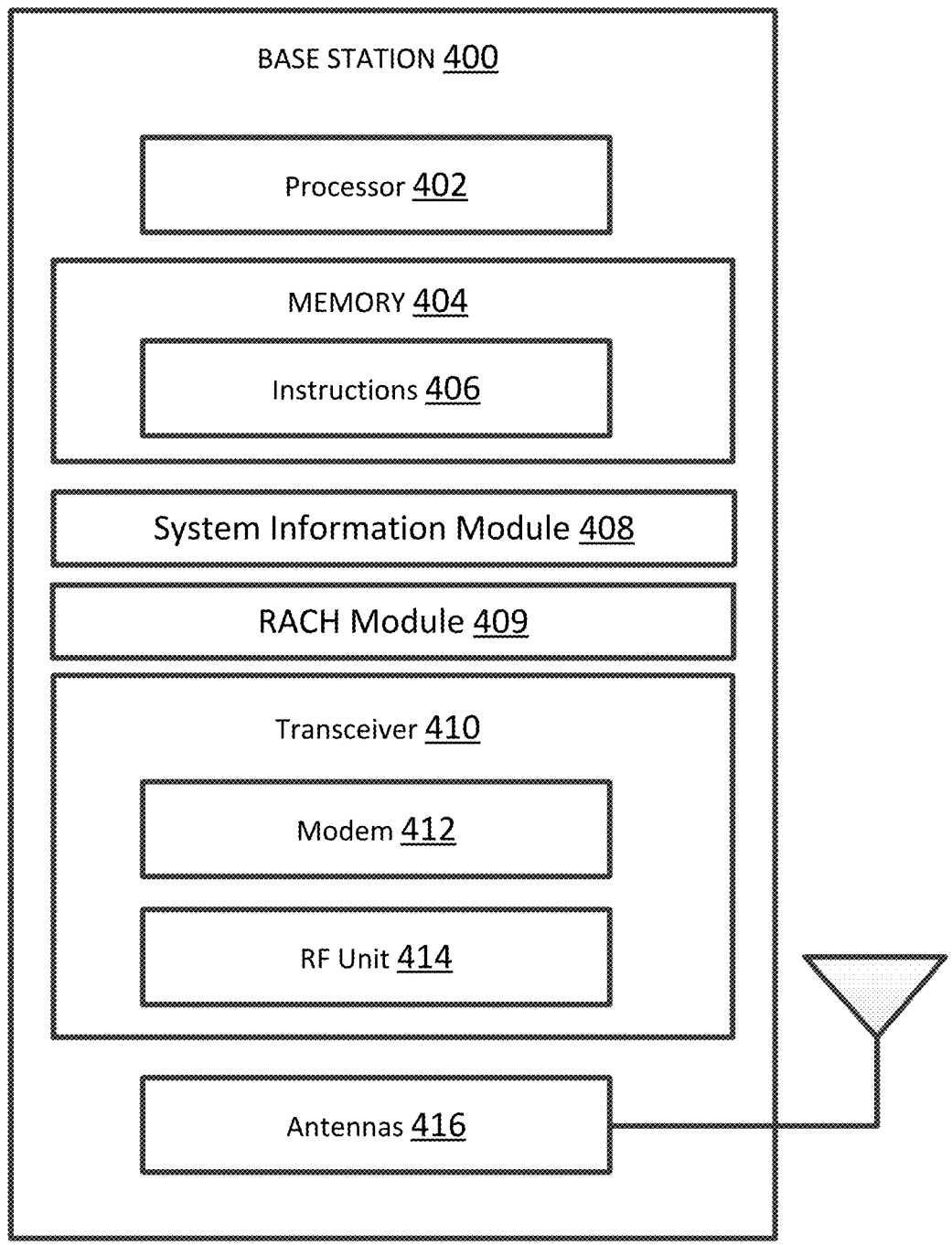
FIG. 4 is a block diagram of an exemplary base station (BS) according to one or more embodiments of the present disclosure.

FIG. 4 is a block diagram of an exemplary BS 400 according to one or more embodiments of the present disclosure. The BS 400 may be a BS 105, as discussed above. As shown, the BS 400 may include a processor 402, a memory 404, a system information module 408, a RACH module 409, a transceiver 410 including a modem subsystem 412 and a radio frequency (RF) unit 414, and one or more antennas 416. These elements may be in direct or indirect communication with each other, for example via one or more buses.

The processor 402 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the BS 105 in connection with embodiments of the present disclosure, for example, aspects of FIGS. 2, 3, 6-10, and 11. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the system information module 408 and the RACH module 409 may be implemented via hardware, software, or combinations thereof. For example, each of the system information module 408 and the RACH module 409 may be implemented as a processor, circuit, and/or instructions 406 stored in the memory 404 and executed by the processor 402. The system information module 408 and the RACH module 409 may be used for various aspects of the present disclosure, for example, aspects of FIGS. 2, 3, 6-10, and 11.

The system information module 408 is configured to transmit in a first frequency band, a first system information signal indicating a first random access configuration for a second frequency band. A random access configuration may include parameters for generating a RACH preamble. In an example, the first frequency band is the NDL unlicensed band, and the second frequency band is the NUL unlicensed band. The system information module 408 may transmit in the NDL unlicensed band, the RMSI indicating the first random access configuration corresponding to the NDL unlicensed band. The first random access configuration indicates RACH resources in the NUL licensed band. In other words, the RACH resources for the first random access configuration are assigned in the NUL licensed band. In some examples, the RMSI indicates the adjustment factor based on a frequency separation between the NDL unlicensed band and the SDL licensed band, beamforming gain, and/or a factor that favors one frequency band over the other. For TDD deployments, the NUL unlicensed band and the NDL unlicensed band are in the same frequency band. For FDD deployments, the NUL unlicensed band is paired with the NDL unlicensed band.

Additionally, the system information module 408 is configured to transmit in a third frequency band, a second system information signal indicating a second random access configuration for the second frequency band, where the first and third frequency bands are different frequency bands. In an example, the third frequency band is the SDL licensed band. The system information module 408 may transmit in the SDL licensed band, the RMSI indicating the second random access configuration corresponding to the SDL licensed band. The second random access configuration indicates RACH resources in the NUL licensed band. In other words, the RACH resources for the second random access configuration are assigned in the NUL licensed band.

The RACH module 409 may perform with a wireless communication device (e.g., a UE), a random access procedure based on at least one of the first random access configuration or the second random access configuration. The BS may perform the random access procedure by receiving a MSG 1, a MSG 3, or eMSG 1 on a RACH resource in the NUL licensed band from the UE, where the RACH resource is indicated by the first random access configuration corresponding to the NDL unlicensed band or indicated by the second random access configuration corresponding to the SDL licensed band. In another example, the BS may perform the random access procedure by transmitting a MSG 2, MSG 4, or eMSG 2 in the SDL licensed band or the NDL unlicensed band in response to receiving a random access message on a RACH resource in the NUL licensed band, where the RACH resource is indicated by the first random access configuration corresponding to the NDL unlicensed band or indicated by the second random access configuration corresponding to the SDL licensed band.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data from the memory 404 and/or the system information module 408 or the RACH procedure module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 400 to enable the BS 400 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs to sustain multiple transmission links. The RF unit 414 may configure the antennas 416.

Figure 5:
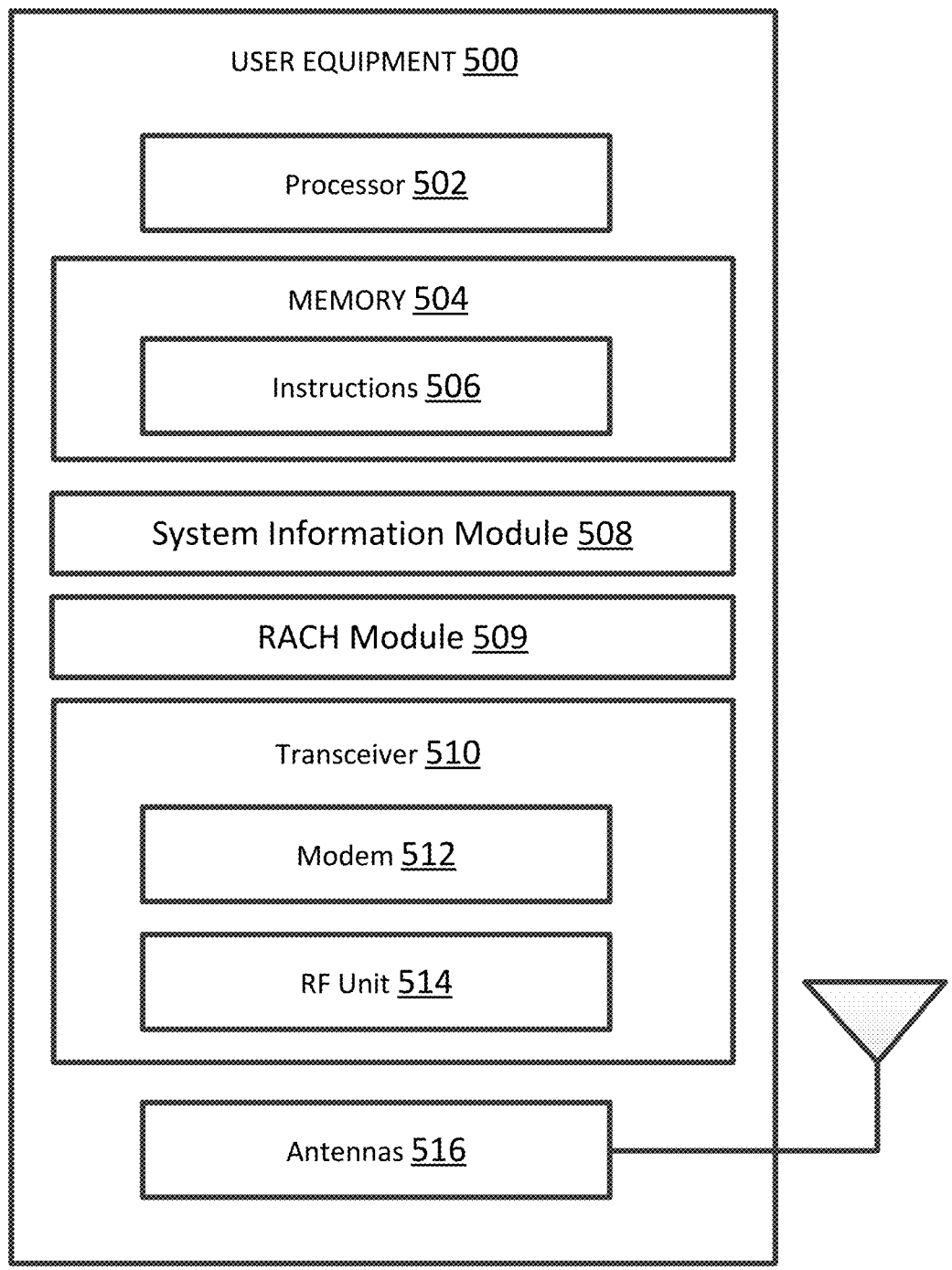
FIG. 5 is a block diagram of an exemplary user equipment (UE) according to one or more embodiments of the present disclosure.

FIG. 5 is a block diagram of an exemplary UE 500 according to one or more embodiments of the present disclosure. The UE 500 may be a UE 115 as discussed above. As shown, the UE 500 may include a processor 502, a memory 504, a system information module 508, a RACH module 509, a transceiver 510 including a modem subsystem 512 and a RF unit 514, and one or more antennas 516.

These elements may be in direct or indirect communication with each other, for example via one or more buses.

The processor 502 may include a CPU, a DSC, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform operations described herein with reference to the UE 115 in connection with embodiments of the present disclosure, for example, aspects of FIGS. 2, 3, 6-10, and 12. Instructions 506 may also be referred to as code, which may be interpreted broadly to include any type of computer-readable statement(s) as discussed above with respect to FIG. 4.

Each of the system information module 508 and the RACH module 509 may be implemented via hardware, software, or combinations thereof. For example, each of the system information module 508 and the RACH module 509 may be implemented as a processor, circuit, and/or instructions 506 stored in the memory 504 and executed by the processor 502. The system information module 508 and the RACH module 509 may be used for various aspects of the present disclosure for example, aspects of FIGS. 2, 3, 6-10, and 12.

The system information module 508 is configured to receive from a wireless communication device in a first frequency band, a first system information signal indicating a first random access configuration for a second frequency band. In an example, the first frequency band is the NDL unlicensed band, and the second frequency band is the NUL unlicensed band. The system information module 508 may receive in the NDL unlicensed band, the RMSI indicating the first random access configuration corresponding to the NDL unlicensed band. The first random access configuration indicates RACH resources in the NUL licensed band. In other words, the RACH resources for the first random access configuration are assigned in the NUL licensed band. In some examples, the RMSI indicates the adjustment factor based on a frequency separation between the NDL unlicensed band and the SDL licensed band, beamforming gain, and/or a factor that favors one frequency band over the other. For TDD deployments, the NUL unlicensed band and the NDL unlicensed band are in the same frequency band. For 1-DD deployments, the NUL unlicensed band is paired with the NDL unlicensed band.

The RACH module 509 is configured to transmit in the second frequency band, a first communication signal including a random access request or a connection request based on the first random access configuration. If the first communication signal includes a random access request, the first communication signal corresponds to MSG 1. If the first communication signal includes a connection request, the first communication signal corresponds to MSG 3. If the first communication signal includes a random access request and a connection request, the first communication signal corresponds to eMSG 1.

Additionally, the RACH module 509 is configured to receive from the wireless communication device in a third frequency band, a second communication signal in response to the first communication signal. In an example, the third frequency band is the SDL licensed band. The UE may select one of the first or the third frequency band based on the estimated pathloss from the SDL measurement taking into account the adjustment factor(s). If the second communication signal includes a RAR, the first communication signal corresponds to the MSG 1. If the second communication signal includes a connection response, the first communication signal corresponds to the MSG 3. If the second communication signal includes a RAR and a connection response, the first communication signal corresponds to eMSG 1.

As shown, the transceiver 510 may include the modem subsystem 512 and the RF unit 514. The transceiver 510 can be configured to communicate bi-directionally with other devices, such as the BSs 105 and/or another core network element. The modem subsystem 512 may be configured to modulate and/or encode the data from the memory 504 and/or the system information module 508 and/or the RACH module 509 according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The antennas 516 may include multiple antennas of similar or different designs in order to sustain multiple transmission links. The RF unit 514 may configure the antennas 516.

Figure 6:
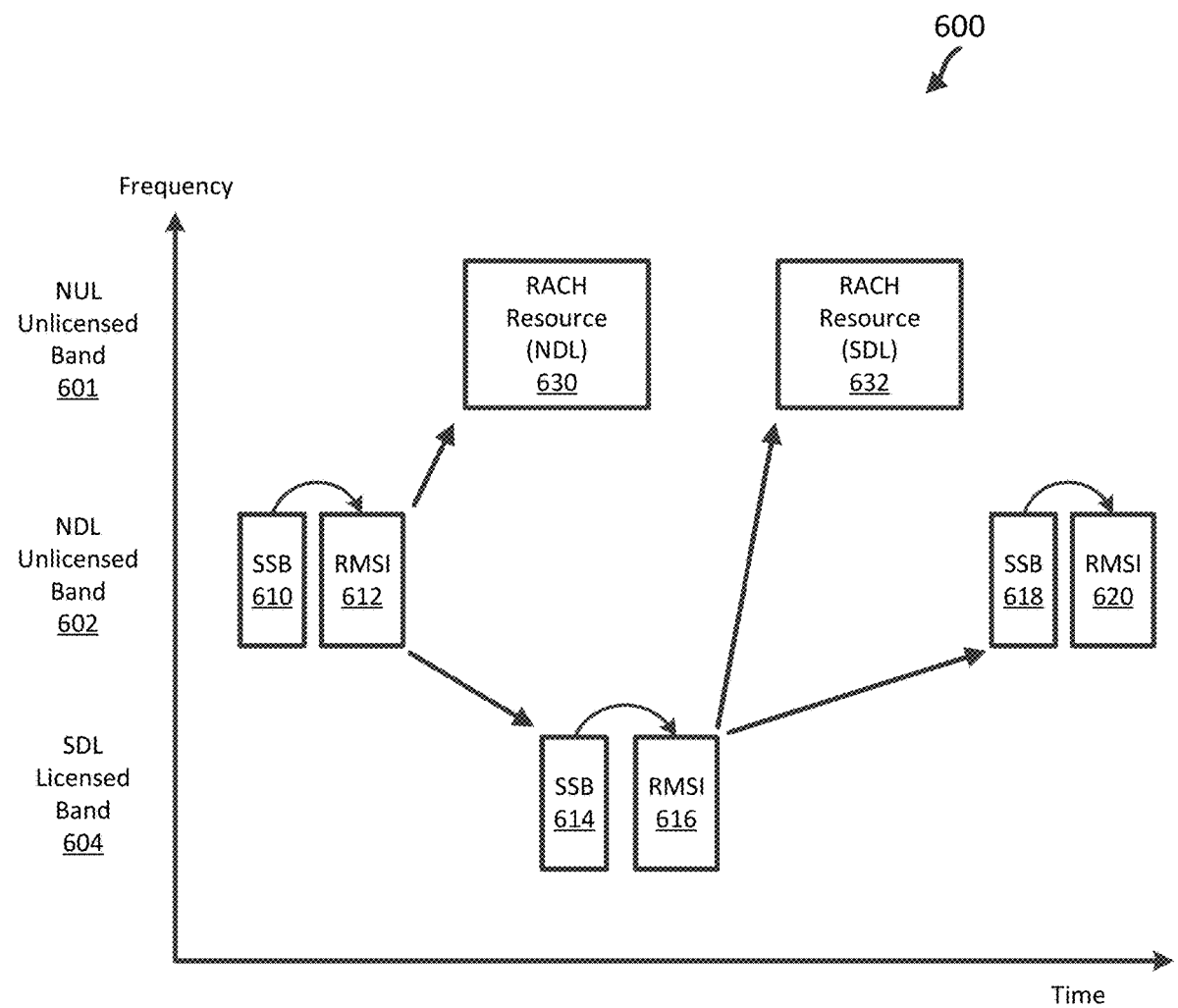
FIG. 6 illustrates a communication scheme for performing a random access procedure using a cross-carrier random access channel (RACH) resource indication according to one or more embodiments of the present disclosure.

FIG. 6 illustrates a communication scheme 600 for performing a random access procedure using a cross-carrier RACH resource indication according to one or more embodiments of the present disclosure. The x-axis represents time in some constant units, and the y-axis represents frequency in some constant units. The scheme 600 may be employed by BSs such as the BSs 105, 400 or by UEs such as the UEs 115, 500 in a network such as the network 100. A BS transmits anchor signals (e.g., SSBs) in both a NDL unlicensed band 602 and a SDL licensed band 604. The BS transmits in a frequency band, a system information signal, which may include a broadcast RMSI signal providing a cross-carrier RACH resource indication providing information to the UE regarding a random access configuration corresponding to one of the DL carriers. A random access configuration may include parameters for generating a RACH preamble. In an example, a random access configuration indicates available RACH resources for transmission of a RACH preamble (e.g., MSG 1) or UL data (e.g., MSG 3) in a NUL unlicensed band 601.

In the example illustrated in FIG. 6, the BS transmits in a NDL unlicensed band 602, a SSB 610 and a system information signal indicating a first random access configuration for the NUL unlicensed band 601. The system information signal may be a broadcast RMSI signal including a RMSI 612 in the NDL unlicensed band 602. The SSB 610 includes a PBCH signal that provides a location (e.g., a time-frequency resource) of the corresponding RMSI 612 in the NDL unlicensed band 602. The UE receives in the NDL unlicensed band 602, the SSB 610 and accordingly is informed of the location and/or scheduling information of the corresponding RMSI 612. The RMSI 612 provides information to the UE about the location of other SSBs in the SDL licensed band 604. For example, the RMSI 612 provides a location of SSB 614 in the SDL licensed band 604. Additionally, the RMSI 612 indicates the first random access configuration for the NUL unlicensed band 601. The first random access configuration corresponds to the NDL unlicensed band 602 and indicates one or more RACH resources (NDL) 630 in the NUL unlicensed band 601.

The BS transmits in the SDL licensed band 604, a SSB 614 and a system information signal indicating a second random access configuration for the NUL unlicensed band 601. The system information signal may be a broadcast RMSI signal including a RMSI 616 in the SDL licensed band 604. The SSB 614 includes a PBCH signal that provides a location (e.g., a time-frequency resource) of the corresponding RMSI 616 in the SDL licensed band 604. The UE receives in the SDL licensed band 604, the SSB 614 and accordingly is informed of the location and/or scheduling information of the corresponding RMSI 616. The RMSI 616 provides information to the UE about the location of other SSBs in the NDL unlicensed band 602. For example, RMSI 616 provides a location of SSB 618 in the NDL unlicensed band 602. Additionally, the RMSI 616 indicates the second random access configuration for the NUL unlicensed band 601. The second random access configuration corresponds to the SDL licensed band 604 and indicates one or more RACH resources (SDL) 632 in the NUL unlicensed band 601.

The RACH resources corresponding to both the NDL unlicensed band 602 and the SDL licensed band 604 are assigned on the common NUL licensed band 601. The UE may receive the anchor signals in the NDL unlicensed band 602 and/or the SDL licensed band 604 from the BS and may select at least one of the RACH resource (NDL) 630 or the RACH resource (SDL) 632 in the NUL unlicensed band 601 for transmitting a random access message to the BS. In an example, the random access message is MSG 1 and includes a random access preamble. In another example, the random access message is MSG 3 and includes a connection request. The BS may perform a random access procedure by receiving a random access message from the UE or by transmitting a random access message to the UE. The BS performs the random access procedure based on the first random access configuration if the BS receives the random access message on the RACH resource (NDL) 630. The BS performs the random access procedure based on the second random access configuration if the BS receives the random access message on the RACH resource (SDL) 632.

In a NR network, a BS may configure a UE for communications in various bandwidth parts (BWPs) within various component carriers (CC). In an example, the RMSI 612 includes DL BW partition (BWP) information for both the NDL unlicensed band 602 and the SDL licensed band 604, and the RMSI 616 includes DL BWP information for both the NDL unlicensed band 602 and the SDL licensed band 604. The RACH resources may be partitioned to distinguish between UEs that transmit a random access message (e.g., RACH preamble or connection request) based on reception from the NDL unlicensed band 602 or the SDL licensed band 604. The UE may select which of the RACH resources (e.g., the RACH resource (NDL) 630 corresponding to the NDL unlicensed band 302 or the RACH resource (SDL) 632 corresponding to the SDL licensed band 604) to use based on various factors.

In some examples, the UE selects, based on the RMSI, one or more RACH resources from either the NDL unlicensed band 602 or the SDL licensed band 604. In an example, the UE selects the RACH resources based on coverage of the RMSI. The UE may measure and compare the signal strength of the SSB 610 in the NDL unlicensed band 602 and the SSB 614 in the SDL licensed band 604, and select the RACH resource associated with the stronger signal strength. In an example, the SDL licensed band 604 is located at frequencies above 6 GHz (e.g., mmWave frequency band), and the NDL unlicensed band 602 is located at frequencies of about sub-6 GHz. When a BS operates at a high-frequency range (e.g., mmWave frequency band), the BS may communicate with a UE using directional beams to overcome the high pathloss in the high-frequency range. To estimate the NUL pathloss from the SDL measurement, the BS may instruct the UE to apply an adjustment factor. In an example, the RMSI indicates the adjustment factor, which may be based on a frequency separation between the NDL unlicensed band 602 and the SDL licensed band 604. To determine the adjustment factor, the UE may determine the relative pathloss between the NDL unlicensed band 602 and the SDL licensed band 604 and compare components given by a ratio of the component carriers. The UE may translate the pathloss estimate occurring on the mmWave frequency band and adjust its UL transmit power to transmit a random access message on the mmWave frequency band.

In some examples, the adjustment factor is based on beamforming gain (if applicable). The BS may coordinate with the UE to cooperatively schedule, beamform, and/or transmit data in the network. Substantial gain may be achieved through use of a multiple antenna system. In mmWave access, for example, antenna elements may be used to take advantage of shorter wavelengths, and to enable beamforming and beam-tracking. Beamforming may be used to avoid transmission losses when using, for example, mmWave frequencies. Beamforming may combine signals from multiple antenna elements in an antenna array, so that the combined signal level increases when several signal phases align (constructive interference). The signals from each antenna element are transmitted with a slightly different phase (delay) to produce a beam directed towards the receiver. A beamformer combines energy over its aperture, obtaining a certain antenna gain in a given direction while having attenuation in others. The UE may adjust the beamforming gain for pathloss to estimate the NUL pathloss from the SDL measurement.

In some examples, the BS introduces additional adjustment factors in favor of one DL band to, for example, maintain a balanced distribution of UEs camped on the NDL unlicensed band 602 and the SDL licensed band 604. For example, if the BS detects a high network load on the NDL unlicensed band 602, the BS may favor the UE selecting the RACH resource (SDL) 632 corresponding to the SDL licensed band 604. In this example, the BS may indicate less pathloss in the SDL licensed band 604 and/or more pathloss in the NDL unlicensed band 602. In another example, if the BS detects a high network load on the SDL licensed band 604, the BS may favor the UE selecting the RACH resource (NDL) 630 corresponding to the NDL unlicensed band 602. In this example, the BS may indicate less pathloss in the NDL unlicensed band 602 and/or more pathloss in the SDL licensed band 604. Taking into consideration the adjustment factor, the UE may estimate the UL transmit power for selecting which of the RACH resource (NDL) 630 or the RACH resource (SDL) 632 to use for performing a random access procedure (e.g., transmitting MSG 1, MSG 3, or eMSG 1).

In some examples, the UE selects RACH resources corresponding to either the NDL unlicensed band 602 or the SDL licensed band 604 based on which frequency band the UE detects a SSB first. To transmit the SSB 610 in the NDL unlicensed band 602, access by the BS is preceded by a CCA to detect whether the BS can reserve the unlicensed medium for data transmission. The determination of whether the BS may reserve the unlicensed medium depends on various factors such as the activity in the unlicensed medium by other communication devices, transmission by higher priority network operating entities, etc. The BS may perform LBT in the NDL unlicensed band 602, and if the LBT results in a LBT pass, the BS transmits the SSB 610 in the NDL unlicensed band 602. If the LBT results in a LBT fail, the BS may back off and perform the LBT procedure again at a later point in time. Due to the LBT fail, the BS may not be able to transmit the SSB 610 in the NDL unlicensed band 602 within the current TXOP. In contrast to the licensed band, it is unnecessary for the BS to contend for channel access to the SDL licensed band 604. The BS's access to the licensed frequency band is more consistent and certain relative to accessing the unlicensed frequency band. Accordingly, the UE may detect the SSB 614 in the SDL licensed band 604, but not detect a SSB in the NDL unlicensed band 602 due to the uncertain nature of the unlicensed band.

Before the BS transmits a SSB in the NDL unlicensed band 602 and/or the UE detects the SSB in the NDL unlicensed band 602, the UE may detect the SSB 614 in the SDL licensed band 604 and accordingly, select RACH Resource (SDL) 632 in the NUL unlicensed band 601 for performing a random access procedure. In an example, the UE performs LBT in the NUL licensed band 601 and transmits in the NUL licensed band 601, a communication signal including a random access request (e.g., MSG 1) or a connection request (e.g., MSG 3) based on the random access configuration corresponding to the SDL licensed band 604. In this example, the UE transmits the random access request or the connection request on the RACH Resource (SDL) 632 if the LBT results in a LBT pass. Accordingly, the UE may successfully transmit MSG 1, MSG 3, or eMSG 1 on RACH resources reserved for the SDL licensed band 604 before the UE detects SSBs in the NDL unlicensed band 602. It should be understood that although examples may describe the SDL licensed band 604 as being in the mmWave frequency band, the SDL licensed band 604 may operate in other frequency bands (e.g., at about 3.5 gigahertz (GHz) or sub-6 GHz) as well.

Figure 7:
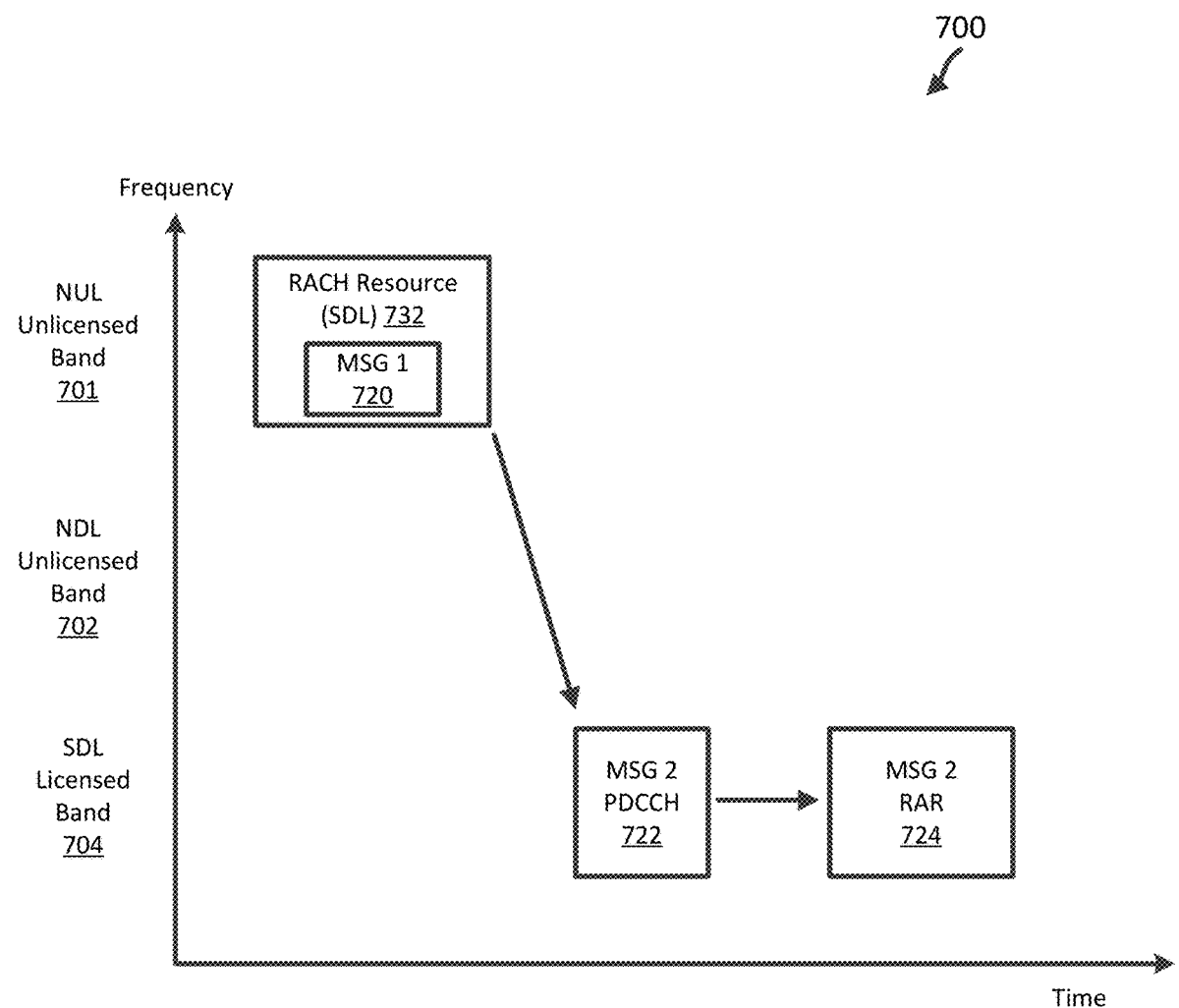
FIG. 7 illustrates a communication scheme for transmitting a response to a random access message of a random access procedure according to one or more embodiments of the present disclosure.

FIG. 7 illustrates a communication scheme 700 for transmitting a response to a random access message of a random access procedure according to one or more embodiments of the present disclosure. The x-axis represents time in some constant units, and the y-axis represents frequency in some constant units. The scheme 700 may be employed by BSs such as the BSs 105, 400 or by UEs such as the UEs 115, 500 in a network such as the network 100.

The UE transmits a random access message (e.g., MSG 1 or MSG 3) on a RACH resource (SDL) 732 in a NUL unlicensed band 701. In the example illustrated in FIG. 7, the UE transmits a "MSG 1" 720 on the RACH resource (SDL) 732, which corresponds to a SDL licensed band 704. In an example, the BS transmits in the SDL licensed band 704, a system information signal indicating a random access configuration for the NUL unlicensed band 701, where the random access configuration indicates the RACH resource (SDL) 732. The BS receives the "MSG 1" 720 in the NUL unlicensed band 701 and determines that the "MSG 1" 720 is in response to reception of the system information signal in the SDL licensed band 704 by the UE.

In response to receiving the "MSG 1" 720, the BS transmits a second random message "MSG 2" in the same DL band corresponding to the RACH resource(s) used by the UE for the MSG 1 transmission. The MSG 2 may carry an UL grant that may be used by the UE to transmit content to the BS. The BS transmits a "MSG 2 PDCCH" 722 and a subsequent "MSG 2 RAR" 724 in the SDL licensed band 704, which corresponds to the RACH resources used by the UE for the MSG 1 transmission. The BS assigns resources via the PDCCH, and the UE monitors the PDCCH for RARs. In the example, the "MSG 2 PDCCH" 722 may indicate DL control information (DCI) carried in a PDCCH. The UE decodes the DCI indicated in the "MSG 2 PDCCH" 722 and based on the information retrieved from decoding the DCI, the UE may decode the "MSG 2 RAR" 724.

It should be understood that if the UE transmits a MSG 1 using a RACH resource (e.g., RACH Resource (NDL) 630 in FIG. 6) corresponding to the NDL unlicensed band 702, the BS may transmit a "MSG 2 PDCCH" and a subsequent "MSG 2 RAR" in the NDL unlicensed band 702, which corresponds to the RACH resources used by the UE for the MSG 1 transmission.

The BS may transmit each SSB within a SSB set using a different beam direction to allow UEs located in different directions with respect to the BS to search and synchronize to the BS. A beam index is assigned to each beam direction, and a beam or beam direction may be mapped to a SSB index. The BS and a UE may exchange various messages during a cell acquisition procedure to establish a communication link. The UE may select a beam that it perceives as being the most optimal beam for UL communications and transmit on the selected beam. In an example, the "MSG 1" 720 and the "MSG 2 PDCCH" 722 correspond to the same beam index, and the "MSG 2 RAR" may or may not correspond to the beam index. The BS may transmit the "MSG 2 PDCCH" 722 in the same frequency band corresponding to the RACH resource used by the UE for the MSG 1 transmission. For example, the UE may transmit the "MSG 1" 720 on the RACH resource (SDL) 732 corresponding to the SDL licensed band 704. In this example, the BS transmits the "MSG 2 PDCCH" 722 in the SDL licensed band 704, which corresponds to the RACH resource (SDL) 732. In another example, the UE transmits the "MSG 1" 720 on the RACH resource (NDL) corresponding to the NDL unlicensed band 702. In this example, the BS transmits the "MSG 2 PDCCH" in the NDL unlicensed band 702, which corresponds to the RACH resource (NDL) used by the UE for the MSG 1 transmission.

As discussed, the BS may or may not transmit the "MSG 2 RAR" using the same beam index as its corresponding "MSG 2 PDCCH." The BS may switch the frequency band used to transmit parts of MSG 2 from the SDL licensed band 804 to the NDL unlicensed band 802, or vice-versa. In an example, the UE may have good coverage on a frequency band and indicate that it is experiencing good signal quality on the frequency band. In another example, the BS is unable to transmit a second portion of the MSG 2 within a current TXOP in which a first portion of the MSG 2 is transmitted. The BS may switch frequency bands for transmission of messages based on, for example, a timing of a TXOP (e.g., whether transmission may be completed within the current TXOP) or the UE's indication that it is experiencing good signal quality on a particular frequency band. Additionally, the UE may transition from one DL channel to another DL channel at any point during the random access procedure (e.g., from MSG 1 to the end of MSG 4). It may be desirable to use either the NDL unlicensed band or the SDL licensed band as flexibly as possible to reduce latency from the random access procedure.

Figure 8:
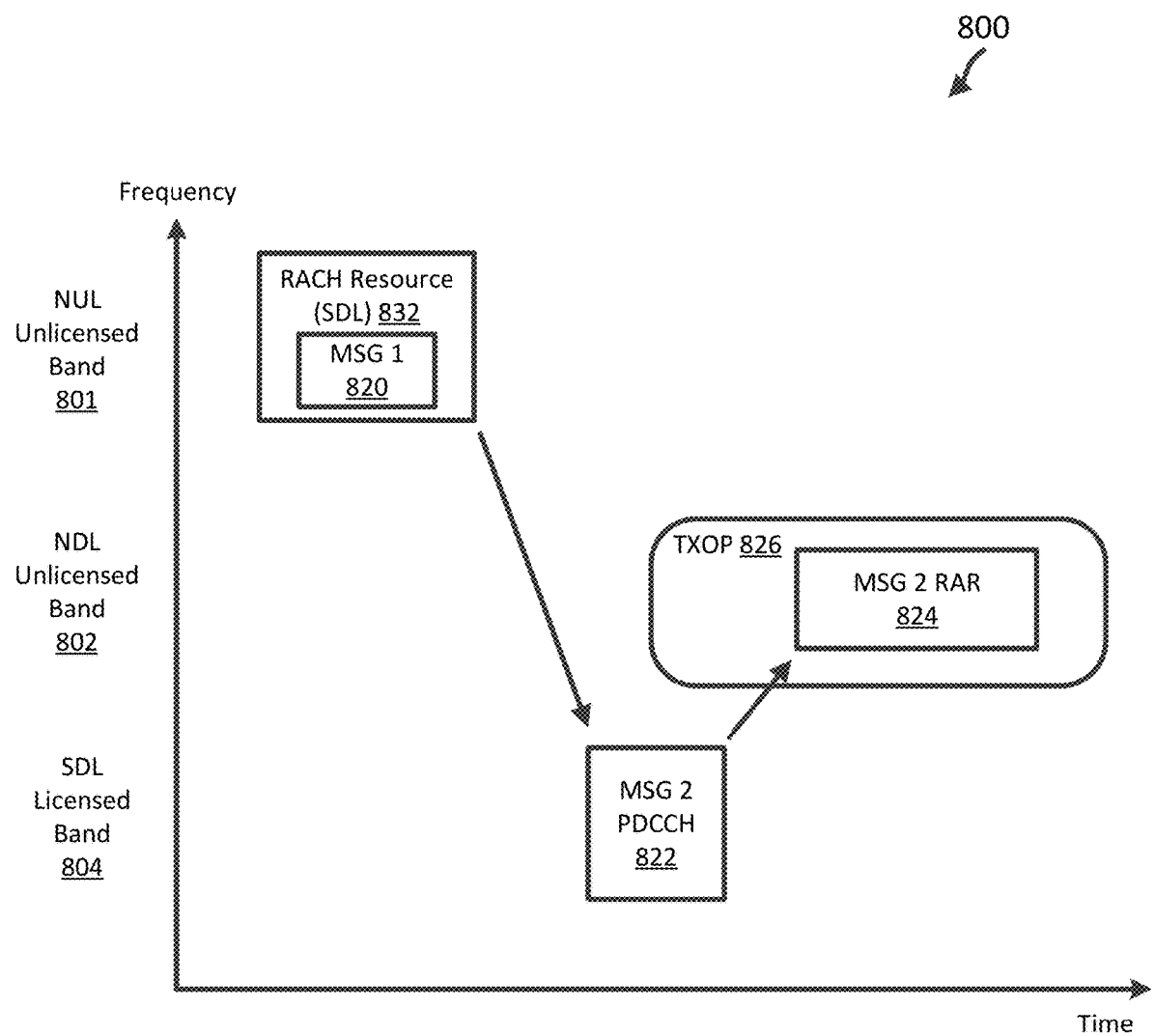
FIG. 8 illustrates a communication scheme for transmitting a response to a random access message of the random access procedure according to one or more embodiments of the present disclosure.

FIG. 8 illustrates a communication scheme 800 for transmitting a response to a random access message of the random access procedure according to one or more embodiments of the present disclosure. The x-axis represents time in some constant units, and the y-axis represents frequency in some constant units. The scheme 800 may be employed by BSs such as the BSs 105, 400 or by UEs such as the UEs 115, 500 in a network such as the network 100.

The UE transmits a random access message (e.g., MSG 1 or MSG 3) on a RACH resource (SDL) 832 in a NUL unlicensed band 801. In the example illustrated in FIG. 8, the UE transmits a "MSG 1" 820 on the RACH resource (SDL) 832, which corresponds to a SDL licensed band 804. In an example, the BS transmits in the SDL licensed band 804, a system information signal indicating a random access configuration for the NUL unlicensed band 801, where the random access configuration indicates the RACH resource (SDL) 832. The BS receives the "MSG 1" 820 in the NUL unlicensed band 801 and determines that the "MSG 1" 820 is in response to reception of the system information signal in the SDL licensed band 804 by the UE.

In response to receiving the "MSG 1" 820, the BS transmits a "MSG 2 PDCCH" 822 and a "MSG 2 RAR" 824, which are transmitted in different DL frequency bands. The BS transmits the "MSG 2 PDCCH" 822 in a SDL licensed band 804. To transmit the "MSG 2 RAR" 824 in the NDL unlicensed band 802, access by the BS is preceded by a CCA to detect whether the BS can reserve the unlicensed medium for data transmission. The BS may switch the frequency band in which to transmit from the SDL licensed band 804 ("MSG 2 RAR" 824) to the NDL unlicensed band 802 based on, for example, whether transmission of the "MSG 2 RAR" 824 may be completed within a current TXOP 826 in the NDL unlicensed band 802. If the LBT results in a LBT pass, the BS may transmit the "MSG 2 RAR" 824 within the current TXOP 826. Additionally, the UE may have good coverage on the NDL unlicensed band 802 and indicate that it is experiencing good signal quality on the NDL unlicensed band 802. The BS may switch the frequency band based on the UE's indication that it is experiencing good signal quality on the NDL unlicensed band 802. Accordingly, different parts of the MSG 2 may be transmitted in different DL bands. The grant on the SDL licensed band 804 may indicate whether the DL data is coming from the NDL unlicensed band 802 or the SDL licensed band 804 for the "MSG 2 RAR" 824.

Figure 9:
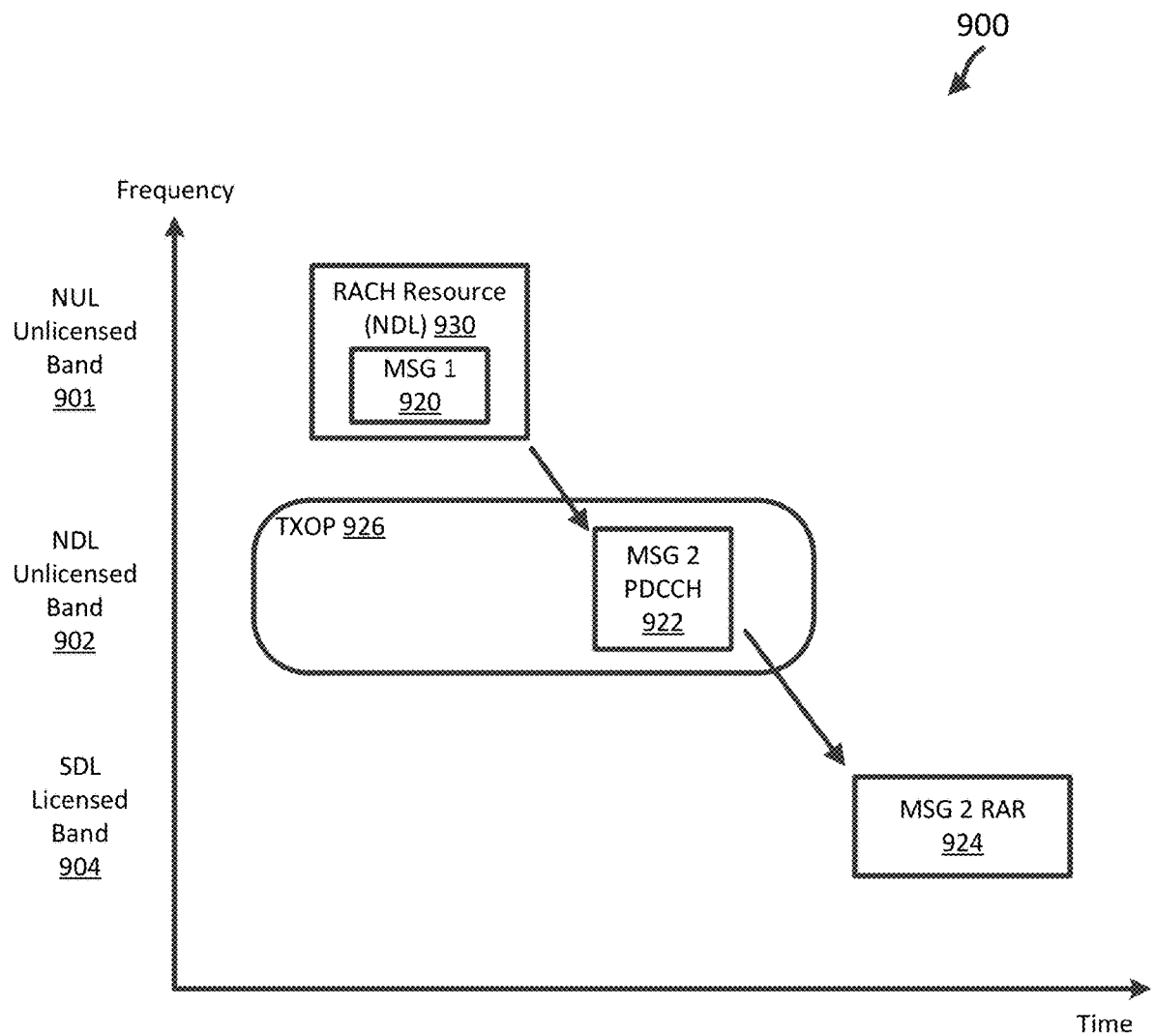
FIG. 9 illustrates a communication scheme for transmitting a response to a random access message of the random access procedure according to one or more embodiments of the present disclosure.

FIG. 9 illustrates a communication scheme 900 for transmitting a response to a random access message of the random access procedure according to one or more embodiments of the present disclosure. The x-axis represents time in some constant units, and the y-axis represents frequency in some constant units. The scheme 900 may be employed by BSs such as the BSs 105, 400 or by UEs such as the UEs 115, 500 in a network such as the network 100.

The UE transmits a random access message (e.g., MSG 1 or MSG 3) on a RACH resource (NDL) 930 in a NUL unlicensed band 901. In the example illustrated in FIG. 9, the UE transmits a "MSG 1" 920 on the RACH resource (NDL) 930, which corresponds to a NDL unlicensed band 902. In an example, the BS transmits in the NDL unlicensed band 902, a system information signal indicating a random access configuration for the NUL unlicensed band 901, where the random access configuration indicates the RACH resource (NDL) 930. The BS receives the "MSG 1" 920 in the NUL unlicensed band 901 and determines that the "MSG 1" 920 is in response to reception of the system information signal in the NDL unlicensed band 902 by the UE.

In response to receiving the "MSG 1" 920, the BS transmits a "MSG 2 PDCCH" 922 and a "MSG 2 RAR" 924, which are transmitted in different DL frequency bands. To transmit the "MSG 2 PDCCH" 922 in the NDL unlicensed band 902, access by the BS is preceded by a CCA to detect whether the BS can reserve the unlicensed medium for data transmission. If the LBT results in a LBT pass, the BS may transmit the "MSG 2 PDCCH" 922 in the NDL unlicensed band 902 within a current TXOP 926 in the NDL unlicensed band 902. The BS may transmit the "MSG 2 RAR" 924 in the SDL licensed band 904 if the BS is unable to complete transmission of the "MSG 2 RAR" 924 within the current TXOP 926 in the NDL unlicensed band 902. The grant on the SDL licensed band 904 may indicate whether the DL data is coming from the NDL unlicensed band 902 or the SDL licensed band 904 for the "MSG 2 RAR" 924. Accordingly, different parts of the MSG 2 may be transmitted in different DL bands. The BS may switch frequency bands for transmission of messages based on, for example, a timing of a TXOP (e.g., whether transmission of the "MSG 2 RAR" 924 may be completed within the current TXOP 926) or the UE's indication that it is experiencing good signal quality on a particular frequency band.

Figure 10:
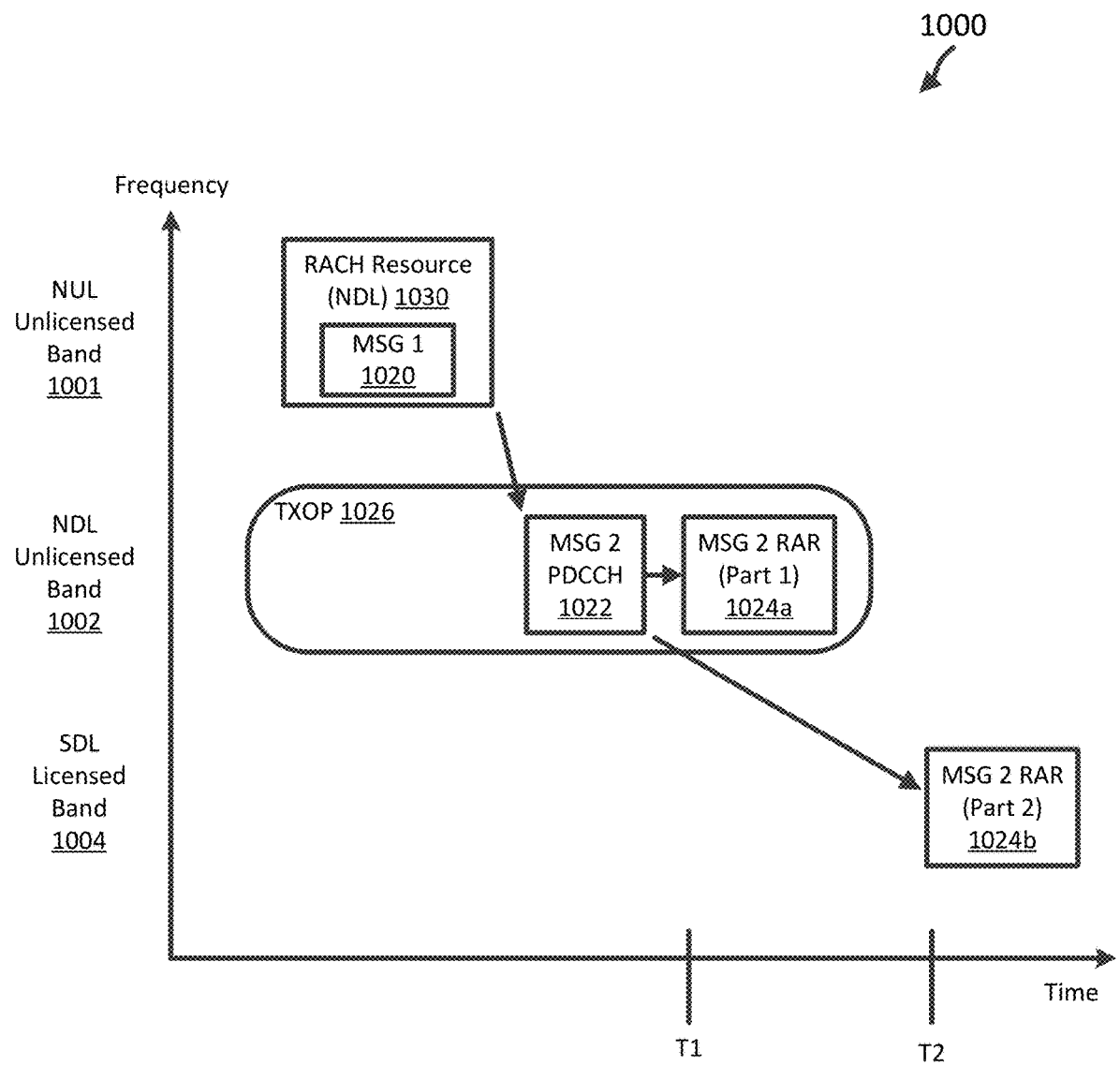
FIG. 10 illustrates a communication scheme for transmitting a response to a random access message of the random access procedure according to one or more embodiments of the present disclosure.

FIG. 10 illustrates a communication scheme 1000 for transmitting a response to a random access message of the random access procedure according to one or more embodiments of the present disclosure. The x-axis represents time in some constant units, and the y-axis represents frequency in some constant units. The scheme 1000 may be employed by BSs such as the BSs 105, 400 or by UEs such as the UEs 115, 500 in a network such as the network 100.

The UE transmits a random access message (e.g., MSG 1 or MSG 3) on a RACH resource (NDL) 1030 in a NUL unlicensed band 1001. In the example illustrated in FIG. 10, the UE transmits a "MSG 1" 1020 on the RACH resource (NDL) 1030, which corresponds to a NDL unlicensed band 1002. In an example, the BS transmits in the NDL unlicensed band 1002, a system information signal indicating a random access configuration for the NUL unlicensed band 1001, where the random access configuration indicates the RACH resource (NDL) 1030. The BS receives the "MSG 1" 1020 in the NUL unlicensed band 1001 and determines that the "MSG 1" 1020 is in response to reception of the system information signal in the NDL unlicensed band 1002 by the UE.

The "MSG 2 RAR" may be partitioned in the time domain between the two different DL carriers includes a "MSG 2 RAR (part 1)" 1024a and a "MSG 2 RAR (part 2)" 1024b. The BS transmits the "MSG 2 RAR (part 1)" 1024a and the "MSG 2 RAR (part 2)" 1024b in different DL frequency bands. In an example, the BS transmits in the NDL unlicensed band 1002, the "MSG 2 PDCCH" 1022 and the "MSG 2 RAR (part 1)" 1024*a* within a current TXOP 1026. The BS transmits the "MSG 2 RAR (part 1)" 1024*a* at a time T1 in the NDL unlicensed band 1002. Additionally, the BS transmits the "MSG 2 RAR (part 2)" 1024*b* at a time T2 in the SDL licensed band 1004. The "MSG 2 RAR" may be partitioned in accordance with a time-domain partitioning scheme between the NDL unlicensed band 1002 and the SDL licensed band 1004.

In some examples, the UE monitors both the NDL unlicensed band and the SDL licensed band for the MSG 2, without an explicit grant from the BS. In this example, signaling may be reduced.

Although random access messages may be illustrated as being MSG 1 and MSG 2 in FIGS. 7-10, it should be understood that the teachings and techniques provided in the present disclosure apply to other random messages as well. For example, in an example, the BS may transmit receive MSG 1, MSG 3, or eMSG 1 from the UE. The BS may transmit MSG 2 in response to MSG 3, transmit MSG 4 in response to MSG 3, and transmit eMSG 2 in response to eMSG 1 to the UE. For example, each reference to "MSG 1" 720 in FIG. 7, "MSG 3" 820 in FIG. 8, "MSG 1" 920 in FIG. 9, and "MSG 1" 1020 in FIG. 10 may be a "MSG 3" that the UE transmits to the BS and the BS receives from the UE. Additionally, each reference to "MSG 2" in FIGS. 7-10 may be a "MSG 4" that the BS transmits to the UE and the UE receives from the BS. In an example, a UL grant in MSG 2 specifies which UL resources the UE may use for transmission of a MSG 3. To transmit the MSG 3 in the NUL unlicensed band, access by the UE is preceded by a CCA to detect whether the UE can reserve the unlicensed medium for data transmission. If the BS transmits the MSG 2 in the SDL licensed band, the UE may perform LBT in the NUL licensed band. When receiving from the SDL licensed band, the UE may apply an adjustment factor taking into consideration, for example, pathloss difference and beamforming gain as discussed.

Additionally, for MSG 4, an association between MSG 2 and MSG 4 transmission may switch from the NDL unlicensed band to the SDL licensed band, or vice-versa (determine whether to use the NDL unlicensed band or the SDL licensed band). The BS may indicate via a DL grant in the MSG 2 which band to use for the MSG 4 transmission. The DL grant for the MSG 4 may switch the frequency bands for transmission of random access messages based on, for example, a timing of a TXOP (e.g., whether transmission may be completed within the current TXOP) or the UE's indication that it is experiencing good signal quality on a particular frequency band).

Moreover, two antenna ports are said to be quasi co-located (QCL) if properties of the channel over which a symbol on one antenna port is conveyed can be inferred from the channel over which a symbol on the other antenna port is conveyed. A QCL indication from a BS for RACH occasions corresponding to SSBs transmitted in the SDL licensed band may be considered with regard to beamforming considerations. The BS may infer which beams may be optimal for use in the SDL licensed band for MSG 2 and/or MSG 4 reception. Additionally, the UE may search for beams that are optimal for MSG 2 and/or MSG 4 reception and correspondingly use the corresponding RACH resources to transmit MSG 1 and/or MSG 3.

Figure 11:
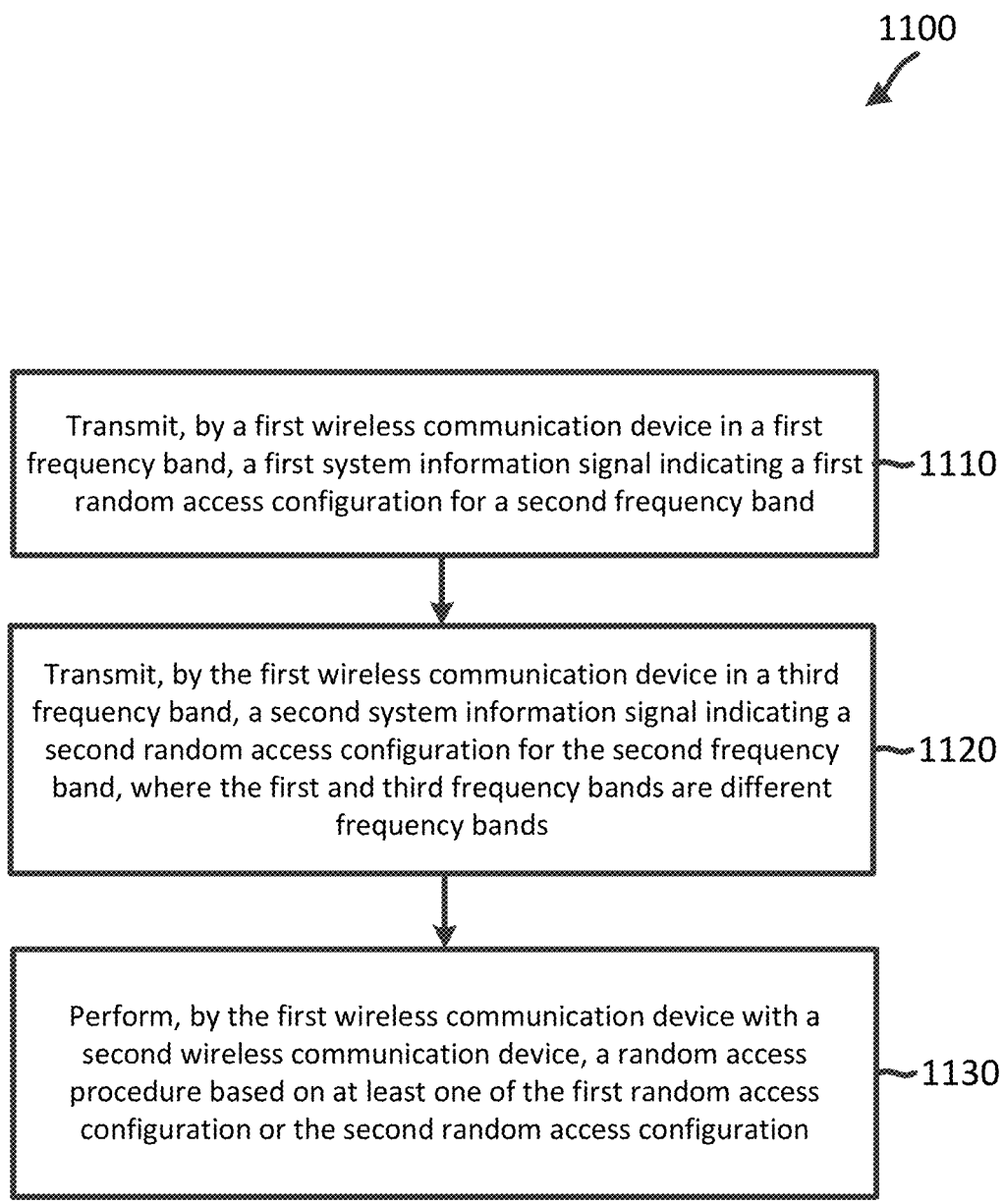
FIG. 11 is a flow diagram of performing a random access procedure in a communication method according to one or more embodiments of the present disclosure.

FIG. 11 is a flow diagram of performing a random access procedure in a communication method 1100 according to one or more embodiments of the present disclosure. Steps of the method 1100 can be executed by a computing device (e.g., a processor, processing circuit, and/or other suitable component) of a wireless communication device, such as the BSs 105, 400, or other suitable means for performing the steps. For example, a wireless communications device, such as the BS 105 or BS 400, may utilize one or more components, such as the processor 402, the memory 404, the system information module 408, the RACH module 409, the transceiver 410, the modem 412, the RF unit 414, and the one or more antennas 416, to execute the steps of method 1100. The method 1100 may employ similar mechanisms as in the schemes 600, 700, 800, 900, and 1000, described above with respect to FIGS. 6-10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes transmitting, by a first wireless communication device in a first frequency band, a first system information signal indicating a first random access configuration for a second frequency band. In an example, the first wireless communication device is a BS, and the second frequency band is the NUL unlicensed band. The first system information signal may be a broadcast RMSI signal indicating the first random access configuration. Additionally, the first random access configuration may indicate a RACH resource (NDL), where the RACH resource (NDL) corresponds to the NDL unlicensed band and is assigned in the NUL unlicensed band.

At step 1120, the method 1100 includes transmitting, by the first wireless communication device in a third frequency band, a second system information signal indicating a second random access configuration for the second frequency band, where the first and third frequency bands are different frequency bands. In an example, the third frequency band is the SDL licensed band, and the second system information signal is a broadcast RMSI signal indicating the second random access configuration. Additionally, the second random access configuration may indicate a RACH resource (SDL), where the RACH resource (SDL) corresponds to the SDL unlicensed band and is assigned in the NUL unlicensed band. In some examples, the RACH resource (NDL) and the RACH resource (SDL) are different and are partitioned in accordance with a time-domain partitioning scheme.

At step 1130, the method 1100 includes performing, by the first wireless communication device with a second wireless communication device, a random access procedure based on at least one of the first random access configuration or the second random access configuration. In an example, the second wireless communication device is a UE, and the BS performs the random access procedure by receiving a random access message (e.g., MSG 1, MSG 3, or eMSG 1) in the second frequency band or transmitting a random access message (e.g., MSG 2, MSG 4, or eMSG 2) or portions thereof in the first frequency band or the third frequency band. In keeping with the above example in which the first random access configuration indicates a RACH resource (NDL) and the second random access configuration indicates a RACH resource (SDL), the BS performs the random access procedure based on the first random access configuration if the BS receives a random access message on the RACH resource (NDL) in the NUL unlicensed band and performs the random access procedure based on the second random access configuration if the BS receives a random access message on the RACH resource (SDL) in the NUL unlicensed band.

In some examples, the first frequency band is a NDL unlicensed band, the second frequency band is a NUL licensed band, and the third frequency band is a SDL licensed band. In an example, the first and second frequency bands are the same. For example, for TDD deployments, the NUL unlicensed band and the NDL unlicensed band are in the same frequency band. In another example, the first frequency band is different from the second frequency band. For example, for FDD deployments, the NUL unlicensed band is paired with the NDL unlicensed band. In some examples, the first frequency band is a SDL licensed band, the second frequency band is a NUL licensed band, and the third frequency band is a NDL unlicensed band.

Figure 12:
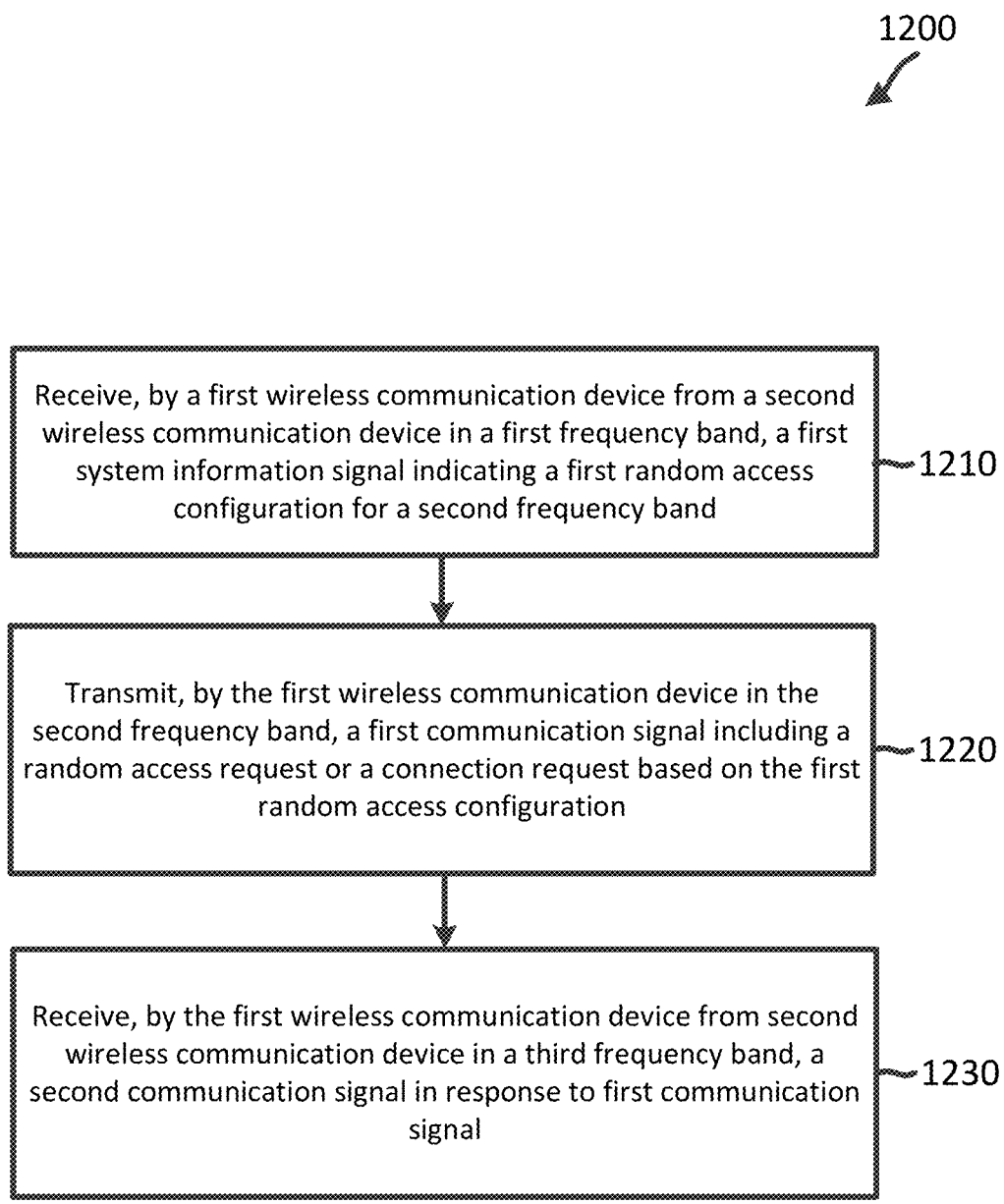
FIG. 12 is a flow diagram of performing a random access procedure in a communication method according to one or more embodiments of the present disclosure.

FIG. 12 is a flow diagram of performing a random access procedure in a communication method 1200 according to one or more embodiments of the present disclosure. Steps of the method 1200 can be executed by a computing device (e.g., a processor, processing circuit, and/or other suitable component) of a wireless communication device, such as the UEs 115, 500, or other suitable means for performing the steps. For example, a wireless communications device, such as the UE 115 or UE 500, may utilize one or more components, such as the processor 502, the memory 504, the system information module 508, the RACH module 509, the transceiver 510, the modem 512, the RF unit 514, and the one or more antennas 516, to execute the steps of method 1200. The method 1200 may employ similar mechanisms as in the schemes 600, 700, 800, 900, and 1000, described above with respect to FIGS. 6-10, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by a first wireless communication device from a second wireless communication device in a first frequency band, a first system information signal indicating a first random access configuration for a second frequency band. In an example, the first wireless communication device is a UE, and the second wireless communication device is a BS. In an example, the first frequency band is the NDL unlicensed band, and the second frequency band is the NUL unlicensed band. In this example, the first system information signal may be a broadcast RMSI signal indicating the first random access configuration, which indicates a RACH resource (NDL) that corresponds to the NDL unlicensed band and is assigned in the NUL unlicensed band. In another example, the first frequency band is the SDL licensed band, and the second frequency band is the NUL unlicensed band. In this example, the first system information signal may be a broadcast RMSI signal indicating the first random access configuration, which indicates a RACH resource (SDL) that corresponds to the SDL licensed band and is assigned in the NUL unlicensed band.

At step 1220, the method 1200 includes transmitting, by the first wireless communication device in the second frequency band, a first communication signal including a random access request or a connection request based on the first random access configuration. In an example, the UE transmits in the NUL licensed band, a first communication signal including a MSG 1, which includes the random access request, based on RACH resource indicated by the first random access configuration. In another example, the UE transmits in the NUL licensed band, a first communication signal including a MSG 3, which includes the connection request, based on RACH resource indicated by the first random access configuration.

At step 1230, the method 1200 includes receiving, by the first wireless communication device from second wireless communication device in a third frequency band, a second communication signal in response to first communication signal. In an example, the UE receives in a SDL licensed band, a second communication signal including a "MSG 2 PDCCH" and a "MSG 2 RAR" in response to transmitting the first communication signal including a random access request. In another example, the UE receives in a SDL licensed band, a second communication signal including a "MSG 2 PDCCH" in response to transmitting the first communication signal including the random access request. Additionally, the UE may receive in a NDL unlicensed band, a third communication signal including a "MSG 2 RAR" within a TXOP in the NDL unlicensed band in response to transmitting the first communication signal including the random access request. In another example, the UE receives in a NDL unlicensed band, a second communication signal including a "MSG 2 PDCCH" in response to transmitting the first communication signal including a random access request. The BS may transmit the "MSG 2 PDCCH" within a current TXOP in the NDL unlicensed band, and the UE may receive the "MSG 2 PDCCH." Additionally, the UE may receive in a SDL licensed band, a third communication signal including a "MSG 2 RAR" in response to transmitting the first communication signal including the random access request. In some examples, the "MSG 2 RAR" is partitioned in accordance with a time-domain partitioning scheme.

In an example, the UE receives in a SDL licensed band, a second communication signal including a "MSG 4 PDCCH" and a "MSG 4 RAR" in response to transmitting the first communication signal including a connection request. In another example, the UE receives in a SDL licensed band, a second communication signal including a "MSG 4 PDCCH" in response to transmitting the first communication signal including the connection request. Additionally, the UE may receive in a NDL unlicensed band, a third communication signal including a "MSG 4 RAR" within a TXOP in the NDL unlicensed band in response to transmitting the first communication signal including the connection request. In another example, the UE receives in a NDL unlicensed band, a second communication signal including a "MSG 4 PDCCH" in response to transmitting the first communication signal including a connection request. The BS may transmit the "MSG 4 PDCCH" within a current TXOP in the NDL unlicensed band, and the UE may receive the "MSG 4 PDCCH." Additionally, the UE may receive in a SDL licensed band, a third communication signal including a "MSG 4 RAR" in response to transmitting the first communication signal including the connection request. In some examples, the "MSG 4 RAR" is partitioned in accordance with a time-domain partitioning scheme.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including a method of wireless communication, including: transmitting, by a base station (BS) in a first frequency band, a first system information signal indicating a first random access configuration for a second frequency band; transmitting, by the BS in a third frequency band, a second system information signal indicating a second random access configuration for the second frequency band, wherein the first and third frequency bands are different frequency bands; and performing, by the BS with a user equipment (UE), a random access procedure based on at least one of the first random access configuration or the second random access configuration.

In some examples, the second frequency band is a normal uplink (NUL) unlicensed band, the first frequency band is one of a normal downlink (NDL) unlicensed band or a supplemental downlink (SDL) licensed band, and the third frequency band is the other of the NDL unlicensed band or the SDL licensed band. In some examples, the first system information signal is a first broadcast remaining minimum system information (RMSI) signal, the second system information signal is a second broadcast RMSI signal, and wherein the first broadcast RMSI signal provides adjustment factors associated with the first frequency band. In some examples, the first random access configuration indicates a first random access channel (RACH) resource and the second random access configuration indicates a second RACH resource, wherein the first RACH resource corresponds to the first frequency band and is in the second frequency band, and the second RACH resource corresponds to the third frequency band and is in the second frequency band.

In some examples, performing the random access procedure based on the first random access configuration includes receiving a RACH preamble on the first RACH resource. In some examples, performing the random access procedure based on the first random access configuration includes transmitting a random access message in response to receiving a random access request or a connection request on the first RACH resource. In some examples, the random access message includes downlink (DL) control information (DCI) carried in a physical downlink control channel (PDCCH) and further includes a random access response (RAR). In some examples, transmitting the random access message includes transmitting the DCI and the RAR in the first frequency band. In some examples, the first frequency band is a SDL licensed band, the third frequency band is a NDL unlicensed band, and transmitting the random access message includes transmitting the DCI in the SDL licensed band, the method further including: performing, by the BS, a listen-before-talk (LBT) in the NDL unlicensed band, where transmitting the random access message includes transmitting the RAR in the NDL unlicensed band if the LBT results in a LBT pass.

In some examples, the first frequency band is a NDL unlicensed band, and the third frequency band is a SDL licensed band, the method further including: performing, by the BS, a LBT in the NDL unlicensed band, where transmitting the random access message includes transmitting the DCI in a current transmission opportunity (TXOP) in the NDL unlicensed band if the LBT results in a LBT pass; determining whether transmission of the RAR can be completed in the current TXOP; and in response to a determination that transmission of the RAR cannot be completed in the current TXOP, transmitting the RAR in the SDL licensed band. In some examples, the method further includes in response to a determination that transmission of the RAR can be completed in the current TXOP, transmitting the RAR in the current TXOP. In some examples, the RAR includes a first RAR portion and a second RAR portion, and the first and second RAR portions are partitioned in accordance with a time-domain partitioning scheme. In some examples, performing the random access procedure based on the first random access configuration includes receiving a connection request on the first RACH resource. In some examples, performing the random access procedure based on the second random access configuration includes receiving a RACH preamble or a connection request on the second RACH resource or includes transmitting a random access message in response to receiving a RACH preamble or a connection request on the second RACH resource.

Further embodiments of the present disclosure include an apparatus including: a transceiver configured to: transmit in a first frequency band, a first system information signal indicating a first random access configuration for a second frequency band; and transmit in a third frequency band, a second system information signal indicating a second random access configuration for the second frequency band, wherein the first and third frequency bands are different frequency bands; and a processor configured to: perform, with a second wireless communication device, a random access procedure based on at least one of the first random access configuration or the second random access configuration.

In some examples, the first and second frequency bands are on the same unlicensed band. In some examples, the first and second frequency bands are on separate bands. In some examples, the second frequency band is a normal uplink (NUL) unlicensed band. In some examples, the first random access configuration indicates a first random access channel (RACH) resource and the second random access configuration indicates a second RACH resource, where the first RACH resource corresponds to the first frequency band and is in the second frequency band, and the second RACH resource corresponds to the third frequency band and is in the second frequency band.

Further embodiments of the present disclosure include a method of wireless communication, including a method of wireless communication, including receiving, by a user equipment (UE) from a base station (BS) in a first frequency band, a system information signal indicating a first random access configuration for a second frequency band; transmitting, by the UE in the second frequency band, a first communication signal including a random access request or a connection request based on the first random access configuration; and receiving, by the UE from the BS in a third frequency band, a second communication signal in response to the first communication signal.

In some examples, the first frequency band is a supplemental downlink (SDL) licensed band or a normal downlink (NDL) unlicensed band, the second frequency band is a normal uplink (NUL) unlicensed band, and the third frequency band is the SDL licensed band or the NDL licensed band. In some examples, the system information signal is a broadcast remaining minimum system information (RMSI) signal indicating the first random access configuration. In some examples, the broadcast RMSI signal provides adjustment factors associated with the first frequency band. In some examples, the first random access configuration indicates a random access channel (RACH) resource, and wherein the RACH resource corresponds to the first frequency band and is in the second frequency band. In some examples, transmitting the first communication signal includes transmitting the random access request on a RACH resource in the second frequency band, and wherein receiving the second communication signal includes receiving a random access response (RAR) in response to the random access request. In some examples, transmitting the first communication signal includes transmitting the connection request on the RACH resource in the second frequency band, and wherein receiving the second communication signal includes receiving a connection response in response to the connection request. In some examples, receiving the second communication signal includes receiving a random access message including downlink control information (DCI) carried in a physical downlink control channel (PDCCH) and further including a RAR. In some examples, receiving the random access message includes receiving the DCI and the RAR in the third frequency band or includes receiving the DCI in the first frequency band and receiving the RAR in the third frequency band.

Further embodiments of the present disclosure include an apparatus including: a transceiver configured to receive from a second wireless communication device in a first frequency band, a system information signal indicating a first random access configuration for a second frequency band; transmit in the second frequency band, a first communication signal including a random access request or a connection request based on the first random access configuration; and receive from second wireless communication device in a third frequency band, a second communication signal in response to the first communication signal. In some examples, the first frequency band is a supplemental downlink (SDL) licensed band or a normal downlink (NDL) unlicensed band, wherein the second frequency band is a normal uplink (NUL) unlicensed band, and wherein the third frequency band is the SDL licensed band or the NDL licensed band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a base station (BS) in a first frequency band, a first system information signal indicating a first random access configuration for a second frequency band;
   transmitting, by the BS in a third frequency band, a second system information signal indicating a second random access configuration for the second frequency band, wherein the first and third frequency bands are different frequency bands; and
   performing, by the BS with a user equipment (UE), a random access procedure based on at least one of the first random access configuration or the second random access configuration.

2. The method of claim 1, wherein the second frequency band is a normal uplink (NUL) unlicensed band, the first frequency band is one of a normal downlink (NDL) unlicensed band or a supplemental downlink (SDL) licensed band, and the third frequency band is the other of the NDL unlicensed band or the SDL licensed band.

3. The method of claim 1, wherein the first system information signal is a first broadcast remaining minimum system information (RMSI) signal, the second system information signal is a second broadcast RMSI signal, and wherein the first broadcast RMSI signal provides adjustment factors associated with the first frequency band.

4. The method of claim 1, wherein the first random access configuration indicates a first random access channel (RACH) resource and the second random access configuration indicates a second RACH resource, wherein the first RACH resource corresponds to the first frequency band and is in the second frequency band, and the second RACH resource corresponds to the third frequency band and is in the second frequency band.

5. The method of claim 4, wherein performing the random access procedure based on the first random access configuration includes receiving a RACH preamble on the first RACH resource.

6. The method of claim 4, wherein performing the random access procedure based on the first random access configuration includes transmitting a random access message in response to receiving a random access request or a connection request on the first RACH resource.

7. The method of claim 6, wherein the random access message includes downlink (DL) control information (DCI) carried in a physical downlink control channel (PDCCH) and further includes a random access response (RAR).

8. The method of claim 7, wherein transmitting the random access message includes transmitting the DCI and the RAR in the first frequency band.

9. The method of claim 7, wherein the first frequency band is a SDL licensed band, and the third frequency band is a NDL unlicensed band, wherein transmitting the random access message includes transmitting the DCI in the SDL licensed band, the method further comprising:
   performing, by the BS, a listen-before-talk (LBT) in the NDL unlicensed band, wherein transmitting the random access message includes transmitting the RAR in the NDL unlicensed band if the LBT results in a LBT pass.

10. The method of claim 7, wherein the first frequency band is a NDL unlicensed band, and the third frequency band is a SDL licensed band, the method further comprising:
performing, by the BS, a LBT in the NDL unlicensed band, wherein transmitting the random access message includes transmitting the DCI in a current transmission opportunity (TXOP) in the NDL unlicensed band if the LBT results in a LBT pass;
determining whether transmission of the RAR can be completed in the current TXOP; and
in response to a determination that transmission of the RAR cannot be completed in the current TXOP, transmitting the RAR in the SDL licensed band.

11. The method of claim 10, comprising:
in response to a determination that transmission of the RAR can be completed in the current TXOP, transmitting the RAR in the current TXOP.

12. The method of claim 7, wherein the RAR includes a first RAR portion and a second RAR portion, and the first and second RAR portions are partitioned in accordance with a time-domain partitioning scheme.

13. The method of claim 4, wherein performing the random access procedure based on the first random access configuration includes receiving a connection request on the first RACH resource.

14. The method of claim 4, wherein performing the random access procedure based on the second random access configuration includes receiving a RACH preamble or a connection request on the second RACH resource or includes transmitting a random access message in response to receiving a RACH preamble or a connection request on the second RACH resource.

15. An apparatus comprising:
a transceiver configured to:
transmit in a first frequency band, a first system information signal indicating a first random access configuration for a second frequency band; and
transmit in a third frequency band, a second system information signal indicating a second random access configuration for the second frequency band, wherein the first and third frequency bands are different frequency bands; and
a processor configured to:
perform, with a second wireless communication device, a random access procedure based on at least one of the first random access configuration or the second random access configuration.

16. The apparatus of claim 15, wherein the first and second frequency bands are on the same unlicensed band.

17. The apparatus of claim 15, wherein the first and second frequency bands are on separate bands.

18. The apparatus of claim 15, wherein the second frequency band is a normal uplink (NUL) unlicensed band.

19. The apparatus of claim 15, wherein the first random access configuration indicates a first random access channel (RACH) resource and the second random access configuration indicates a second RACH resource, wherein the first RACH resource corresponds to the first frequency band and is in the second frequency band, and the second RACH resource corresponds to the third frequency band and is in the second frequency band.

20. A method of wireless communication, comprising:
receiving, by a user equipment (UE) from a base station (BS) in a first frequency band, a system information signal indicating a first random access configuration for a second frequency band;
transmitting, by the UE in the second frequency band, a first communication signal including a random access request or a connection request based on the first random access configuration; and
receiving, by the UE from the BS in a third frequency band, a second communication signal in response to the first communication signal.

21. The method of claim 20, wherein the first frequency band is a supplemental downlink (SDL) licensed band or a normal downlink (NDL) unlicensed band, wherein the second frequency band is a normal uplink (NUL) unlicensed band, and wherein the third frequency band is the SDL licensed band or the NDL licensed band.

22. The method of claim 20, wherein the system information signal is a broadcast remaining minimum system information (RMSI) signal indicating the first random access configuration.

23. The method of claim 22, wherein the broadcast RMSI signal provides adjustment factors associated with the first frequency band.

24. The method of claim 23, wherein the first random access configuration indicates a random access channel (RACH) resource, and wherein the RACH resource corresponds to the first frequency band and is in the second frequency band.

25. The method of claim 20, wherein transmitting the first communication signal includes transmitting the random access request on a RACH resource in the second frequency band, and wherein receiving the second communication signal includes receiving a random access response (RAR) in response to the random access request.

26. The method of claim 25, wherein transmitting the first communication signal includes transmitting the connection request on the RACH resource in the second frequency band, and wherein receiving the second communication signal includes receiving a connection response in response to the connection request.

27. The method of claim 20, wherein receiving the second communication signal includes receiving a random access message including downlink control information (DCI) carried in a physical downlink control channel (PDCCH) and further including a RAR.

28. The method of claim 27, wherein receiving the random access message includes receiving the DCI and the RAR in the third frequency band or includes receiving the DCI in the first frequency band and receiving the RAR in the third frequency band.

29. An apparatus comprising:
a transceiver configured to:
receive from a second wireless communication device in a first frequency band, a system information signal indicating a first random access configuration for a second frequency band;
transmit in the second frequency band, a first communication signal including a random access request or a connection request based on the first random access configuration; and
receive from second wireless communication device in a third frequency band, a second communication signal in response to the first communication signal.

30. The apparatus of claim 29, wherein the first frequency band is a supplemental downlink (SDL) licensed band or a normal downlink (NDL) unlicensed band, wherein the second frequency band is a normal uplink (NUL) unlicensed band, and wherein the third frequency band is the SDL licensed band or the NDL licensed band.

* * * * *